US012812154B2

(12) United States Patent
Sjöberg et al.

(10) Patent No.: US 12,812,154 B2
(45) Date of Patent: Nov. 24, 2026

(54) TILE SHUFFLING FOR 360 DEGREE VIDEO DECODING

(71) Applicant: Telefonaktiebolaget LM Ericsson (publ), Stockholm (SE)

(72) Inventors: Rickard Sjöberg, Stockholm (SE); Magnus Westerlund, Upplands Väsby (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 18/960,461

(22) Filed: Nov. 26, 2024

(65) Prior Publication Data

US 2025/0159224 A1 May 15, 2025

Related U.S. Application Data

(63) Continuation of application No. 18/223,584, filed on Jul. 19, 2023, now Pat. No. 12,160,599, which is a
(Continued)

(51) Int. Cl.
*H04N 19/44* (2014.01)
*H04N 19/119* (2014.01)
(Continued)

(52) U.S. Cl.
CPC ........... *H04N 19/44* (2014.11); *H04N 19/119* (2014.11); *H04N 19/159* (2014.11); *H04N 19/176* (2014.11); *H04N 19/88* (2014.11)

(58) Field of Classification Search
CPC .... H04N 19/44; H04N 19/119; H04N 19/159; H04N 19/176; H04N 19/88
See application file for complete search history.

(56) References Cited

U.S. PATENT DOCUMENTS 9,300,976 B2 3/2016 Fuldseth
9,712,837 B2 7/2017 Wang et al.
(Continued)

FOREIGN PATENT DOCUMENTS

CN 1555654 A 12/2004
CN 102656887 A 9/2012
(Continued)

OTHER PUBLICATIONS

He, Y. et al., "AHG12: On Rectangular Tile Group", Joint Video Experts Team (JVET) of ITU-T SG 16 WP 3 and ISO/IEC JTC 1/SC 29/ WG 11 13th Meeting, Marrakech, MA, Jan. 9, 2019, pp. 1-9, JVET-M0121, ITU.
(Continued)

*Primary Examiner* — Dave Czekaj
*Assistant Examiner* — Shanika M Brumfield
(74) *Attorney, Agent, or Firm* — COATS & BENNETT, PLLC

(57) ABSTRACT

A decoder receives a set of N compressed segments of a first picture, and a set of M compressed segments for a second picture that follows the first picture in a decoding order. Based on the set of N compressed segments, the decoder constructs a decodable picture for the first picture and decodes the decodable picture. Based on the set of M compressed segments, the decoder constructs a decodable second picture in the compressed domain, in which each of the segments of the first picture are placed at the same spatial position as that of a corresponding segment in the second picture and decodes the decodable second picture. Additionally, at least one Intra coded segment is placed at one of the M spatial positions in the compressed domain in which there is no segment of the N segments.

20 Claims, 12 Drawing Sheets

Related U.S. Application Data continuation of application No. 17/254,561, filed as application No. PCT/EP2019/066393 on Jun. 20, 2019, now Pat. No. 11,711,530.

(60) Provisional application No. 62/688,326, filed on Jun. 21, 2018.

(51) Int. Cl.
*H04N 19/159* (2014.01)
*H04N 19/176* (2014.01)
*H04N 19/88* (2014.01)

(56) References Cited

U.S. PATENT DOCUMENTS

| | | | |
|---|---|---|---|
| 9,736,482 | B2 | 8/2017 | Hendry et al. |
| 9,762,912 | B2 | 9/2017 | Zhu et al. |
| 10,104,386 | B2 | 10/2018 | Suehring et al. |
| 10,419,752 | B2 | 9/2019 | Lim et al. |
| 10,523,933 | B2 | 12/2019 | Wu et al. |
| 10,609,414 | B2 | 3/2020 | Zhang et al. |
| 10,893,268 | B2 | 1/2021 | Jung et al. |
| 11,134,265 | B2 | 9/2021 | Laroche |
| 11,405,610 | B2 | 8/2022 | Wang et al. |
| 11,477,470 | B2 | 10/2022 | Pettersson et al. |
| 2003/0138052 | A1 | 7/2003 | Dufour et al. |
| 2009/0279601 | A1 | 11/2009 | Strom et al. |
| 2009/0320081 | A1 | 12/2009 | Chui et al. |
| 2012/0189049 | A1 | 7/2012 | Coban et al. |
| 2012/0263231 | A1 | 10/2012 | Zhou |
| 2012/0328004 | A1 | 12/2012 | Coban et al. |
| 2013/0016786 | A1 | 1/2013 | Segall |
| 2013/0101035 | A1* | 4/2013 | Wang .................. H04N 19/174 375/E7.243 |
| 2013/0114735 | A1 | 5/2013 | Wang |
| 2014/0086333 | A1 | 3/2014 | Wang |
| 2014/0119671 | A1 | 5/2014 | Lim et al. |
| 2014/0247875 | A1 | 9/2014 | Hattori et al. |
| 2015/0117538 | A1 | 4/2015 | Sjoberg et al. |
| 2016/0295200 | A1 | 10/2016 | Bruls |
| 2016/0353108 | A1 | 12/2016 | Zhang et al. |
| 2017/0034526 | A1 | 2/2017 | Rapaka et al. |
| 2017/0332084 | A1 | 11/2017 | Seregin et al. |
| 2018/0098077 | A1 | 4/2018 | Skupin et al. |
| 2018/0109810 | A1* | 4/2018 | Xu ...................... H04N 19/597 |
| 2018/0139453 | A1 | 5/2018 | Park et al. |
| 2018/0249163 | A1 | 8/2018 | Curcio et al. |
| 2019/0273923 | A1 | 9/2019 | Huang et al. |
| 2019/0281217 | A1 | 9/2019 | Kim |
| 2020/0029080 | A1 | 1/2020 | Kim et al. |
| 2020/0260063 | A1 | 8/2020 | Hannuksela |
| 2020/0260071 | A1 | 8/2020 | Hannuksela et al. |
| 2020/0322587 | A1 | 10/2020 | Oh et al. |
| 2020/0336740 | A1 | 10/2020 | Fang et al. |
| 2020/0374505 | A1 | 11/2020 | Kammachi Sreedhar et al. |
| 2021/0195226 | A1 | 6/2021 | Zhao et al. |
| 2021/0211664 | A1 | 7/2021 | Wang et al. |
| 2021/0360234 | A1 | 11/2021 | Wang et al. |
| 2021/0385514 | A1 | 12/2021 | Da Silva Pratas Gabriel et al. |
| 2023/0013104 | A1 | 1/2023 | Pettersson et al. |
| 2023/0107973 | A1 | 4/2023 | Crispel et al. |
| 2024/0163431 | A1 | 5/2024 | Abe et al. |

FOREIGN PATENT DOCUMENTS

| | | | | |
|---|---|---|---|---|
| CN | 104221388 | A | 12/2014 | |
| CN | 105144720 | A | 12/2015 | |
| CN | 105432082 | A | 3/2016 | |
| CN | 105744272 | A | 7/2016 | |
| CN | 106105209 | A | 11/2016 | |
| CN | 107181960 | A | 9/2017 | |
| CN | 107409212 | A | 11/2017 | |
| EP | 3328081 | A1 | 5/2018 | |
| EP | 3468186 | A1 | 4/2019 | |
| GB | 2557430 | A | 6/2018 | |
| RU | 2648571 | C2 | 3/2018 | |
| WO | 2012119569 | A1 | 9/2012 | |
| WO | 2013027407 | A1 | 2/2013 | |
| WO | 2013063094 | A1 | 5/2013 | |
| WO | 2014003428 | A1 | 1/2014 | |
| WO | 2016026526 | A2 | 2/2016 | |
| WO | 2016123476 | A1 | 8/2016 | |
| WO | 2016180741 | A2 | 11/2016 | |
| WO | 2017137444 | A1 | 8/2017 | |
| WO | 2017172783 | A1 | 10/2017 | |
| WO | 2017197434 | A1 | 11/2017 | |
| WO | 2017212930 | A1 | 12/2017 | |
| WO | WO-2020140066 | A1 * | 7/2020 | ............. H04N 19/66 |

OTHER PUBLICATIONS

Bross, B. et al., "Versatile Video Coding (Draft 4)", Joint Video Experts Team (JVET) of ITU-T SG 16 WP 3 and ISO/IEC JTC 1/SC 29/ WG 11 13th Meeting, Marrakech, MA, Jan. 9, 2019, pp. 1-244, JVET-M1001-v2, ITU.

Sjöberg, R. et al., "Flexible Tiles", Joint Video Experts Team (JVET) of ITU-T SG 16 WP 3 and ISO/IEC JTC 1/SC 29/WG 11 11th Meeting, Ljubljana, SI, Jul. 10, 2018, pp. 1-10, JVET-K0260-v2, ITU.

Hannuksela, M. et al., "Design Goals for Tiles", Joint Video Experts Team (JVET) of ITU-T SG 16 WP 3 and ISO/IEC JTC 1/SC 29/WG 11 11th Meeting, Ljubljana, SI, Jul. 10, 2018, pp. 1-8, JVET-K0300-v1, ITU.

Wang, Y. et al., "Tile Groups", Joint Collaborative Team on Video Coding (JCT-VC) of ITU-T SG16 WP3 and ISO/IEC JTC1/SC29/WG11 8th Meeting, San José, USA, Feb. 1, 2012, pp. 1-8, JCTVC-G0520, ITU.

Sjöberg, R. et al., "Tile groups for VVC", Joint Video Experts Team (JVET) of ITU-T SG16 WP 3 and ISO/IEC JTC 1/SC 29/ WG 11 12th Meeting, Macao, CN, Oct. 3, 2018, pp. 1-4, JVET-L0415-v1, ITU.

Richardson, I., "Chapter 6: H.264/MPEG4 Part 10", H.264 and MPEG-4 Video Compression: Video Coding for Next-Generation Multimedia, Jan. 1, 2003, pp. 159-223, John Wiley & Sons, Ltd.

Bross, B. et al., "High Efficiency Video Coding (HEVC) Text Specification Draft 10 (for FDIS & Last Call)", Joint Collaborative Team on Video Coding (JCT-VC) of ITU-T SG 16 WP 3 and ISO/IEC JTC 1/SC 29/WG 11 12th Meeting, Geneva, CH, Jan. 14, 2013, pp. 1-310, JCTVC-L1003_v34, ITU.

Sjöberg, R. et al., "Flexible Tiles", Joint Video Experts Team (JVET) of ITU-T SG 16 WP 3 and ISO/IEC JTC 1/SC 29/WVG 11 11th Meeting, Ljubljana, SI, Jul. 10, 2018, pp. 1-7, JVET-K0260-v1, ITU.

Wu, Y. et al., "Motion-Constrained Tile Sets SEI Message", Joint Collaborative Team on Video Coding (JCT-VC) of ITU-T SG 16 WP 3 and ISO/IEC JTC 1/SC 29/WG 11 13th Meeting, Incheon, KR, Apr. 18, 2013, pp. 1-4, JCTVC-M0235-v1, ITU.

Wiegand, T., "Draft Text of Final Draft International Standard for Advanced Video Coding (ITU-T Rec. H.264 | ISO/IEC 14496-10 AVC)", International Organization for Standardisation Coding of Moving Pictures and Audio, ISO/IEC JTC 1/SC 29/WG 11 N5555, Mar. 1, 2003, pp. 1-242, ITU.

Skupin, R. et al., "HEVC Tile Based Streaming to Head Mounted Displays", 2017 14th IEEE Annual Consumer Communications & Networking Conference (CCNC), Jan. 8, 2017, pp. 1-3, IEEE.

Sanchez, Y. et al., "Random Access Point Period Optimization for Viewport Adaptive Tile Based Streaming of 360 Video", 2017 IEEE International Conference on Image Processing (ICIP), Sep. 17, 2017, pp. 1-5, IEEE.

Puri, A. et al., "Video Coding Using the H.264/MPEG-4 AVC Compression Standard", Signal Processing: Image Communication, vol. 19 No. 9, Oct. 1, 2004, pp. 793-849, Elsevier.

Sánchez, Y. et al., "Compressed Domain Video Processing for Tile Based Panoramic Streaming Using HEVC", 2015 IEEE International Conference on Image Processing (ICIP), Sep. 27, 2015, pp. 2244-2248, IEEE.

(56) References Cited

OTHER PUBLICATIONS

Sullivan, G. et al., "Standardized Extensions of High Efficiency Video Coding (HEVC)", IEEE Journal of Selected Topics in Signal Processing, vol. 7 No. 6, Dec. 1, 2013, pp. 1001-1016, IEEE.
International Telecommunication Union, "High efficiency video coding", Series H: Audiovisual and Multimedia Systems: Infrastructure of audiovisual services—Coding of moving video, Dec. 1, 2016, pp. 83-84, 352, ITU-T H.265, ITU.
Bross, B. et al., "High Efficiency Video Coding (HEVC) text specification draft 10 (for FDIS & Consent)", Joint Collaborative Team on Video Coding (JCT-VC) of ITU-T SG 16 WP 3 and ISO/IEC JTC 1/SC 29/WG 11, 12th Meeting: Geneva, CH, Jan. 14-23, 2013, Document: JCTVC-L1003_v30, Draft Rec. ITU-T H.HEVC (201x E), pp. 1-297, IEEE.

* cited by examiner

TILE SHUFFLING FOR 360 DEGREE VIDEO DECODING

RELATED APPLICATIONS

The present application is a continuation of U.S. patent application Ser. No. 18/223,584 filed on Jul. 19, 2023, which is a continuation of U.S. patent application Ser. No. 17/254,561 filed on Dec. 21, 2020, now U.S. Pat. No. 11,711,530, which is a national stage application of PCT/EP2019/066393, which was filed Jun. 20, 2019, and claims benefit of U.S. Provisional Application 62/688,326, which was filed Jun. 21, 2018, the disclosures of each of which are incorporated herein by reference in their entirety.

TECHNICAL FIELD

The present disclosure relates generally to video encoding and decoding techniques, and more particularly, to the shuffling the segments of a picture.

BACKGROUND

Currently, a video format known as "360-degree video" is used to convey and display virtual reality (VR) content to users. A typical user device comprises a head-mounted display (HMD), which is a headset worn by a user. While wearing the HMD, the user's view of the outside world (i.e., the user's ambient environment) is shielded. However, video is rendered to the user on embedded eye glasses to provide the user with a visual impression of being located somewhere else—i.e., in a virtual reality. One main feature of HMD devices is that they track head movements and render the video accordingly to give the user an impression of looking around the virtual reality.

SUMMARY

Embodiments of the present disclosure provide a decoder device configured to decode pictures for rendering to a user. The pictures may be associated with a video sequence sent to a Head Mounted Display (HMD) device, for example.

In one embodiment, the present disclosure provides a method of decoding a picture. The method comprises receiving a set of N compressed segments of a first picture, constructing a decodable picture for the first picture, wherein the set of N compressed segments are placed in spatial positions in a compressed domain, and decoding the decodable picture. The method also comprises receiving a set of M compressed segments for a second picture that follows the first picture in a decoding order, in which:

- M is equal to N;
- the set of M compressed segments comprises one or more segments T1 and at least one Intra coded segment T3;
- the set of N compressed segments comprises one or more segments T2;
- the spatial positions of the one or more segments T1 in an output domain are the same as the spatial positions of the one or more segments T2 in the output domain, but the set of segments T2 does not comprise a segment having a spatial position in the output domain that is the same as a spatial position of the at least one Intra coded segment T3.

The method further comprises constructing a decodable second picture and decoding the decodable second picture. In this embodiment, each of the at least one segments T1 are placed at the same spatial position in the compressed domain as that of a corresponding segment T2, and the at least one Intra coded segment T3 is placed at one of the spatial positions of the segments T1 in the compressed domain in which there are no segments T2.

In one embodiment, each segment T1 for which there is a corresponding segment T2 in the same spatial position in the output domain is coded using temporal prediction.

In one embodiment, a number of segments T1 and T2 having the same spatial position in the output domain is equal to K. In such embodiments, all remaining segments (M−K) in the second picture are coded using Intra prediction.

In one embodiment, K is greater than 1.

In one embodiment, the number of segments in the compressed domain is fixed.

In one embodiment, the number of spatial locations configured to receive a segment in the compressed domain is fixed.

In one embodiment, the segments inserted into the compressed domain are inserted into the spatial position of a segment that was removed from the compressed domain.

In one embodiment, the method further comprises mapping the spatial locations in the output domain to a corresponding segment.

In one embodiment, mapping the spatial locations in the output domain to a corresponding segment comprises identifying the corresponding segment in the compressed domain, identifying the spatial position of the corresponding segment in the compressed domain, and identifying transformation of samples from the compressed domain to the output domain.

In one embodiment, identifying the corresponding segment in the compressed domain comprises identifying the corresponding segment using a segment ID.

In one embodiment, identifying the corresponding segment in the compressed domain comprises identifying the corresponding segment according to an order of mapping data.

In one embodiment, the order of the mapping data comprises an order in which the segments are sent in the video bitstream.

In one embodiment, the mapping data is sent interleaved with compressed segment data.

In one embodiment, identifying the corresponding segment in the compressed domain comprises specifying a location of a segment sample in the compressed domain.

In one embodiment, specifying a location of a segment sample in the compressed domain comprises specifying the coordinates of a segment rectangle.

In one embodiment, the method further comprises identifying a position of a segment in the output domain using coordinates of a rectangle in the output domain.

In one embodiment, the method further comprises mapping a segment in the compressed domain to a segment position in the output domain.

In one embodiment, mapping the segment comprises indexing each segment position in the output domain, and assigning an output index value to each segment in the compressed domain, wherein the output index value corresponds to an indexed segment position in the output domain.

In one embodiment, the mapping is applied after a picture has been decoded to output the picture in the output domain.

In one embodiment, the mapping is applied before a picture has been decoded to arrange the segments in a bitstream, and after decoding to output the picture to the output domain.

In one embodiment, the second decodable picture comprises a frame packing of segments, and a projection of the entire sphere.

In one embodiment, the method is implemented at a server.

Embodiments of the present disclosure also provide a decoding device comprising interface circuitry and processing circuitry. In these embodiments, the processing circuitry is configured to receive a set of N compressed segments of a first picture, construct a decodable picture for the first picture, wherein the set of N compressed segments are placed in spatial positions in a compressed domain, and decode the decodable picture. The processing circuitry is also configured to receive a set of M compressed segments for a second picture that follows the first picture in a decoding order, in which:

M is equal to N;

the set of M compressed segments comprises one or more segments T1 and at least one Intra coded segment T3;

the set of N compressed segments comprises one or more segments T2;

the spatial positions of the one or more segments T1 in an output domain are the same as the spatial positions of the one or more segments T2 in the output domain, but the set of segments T2 does not comprise a segment having a spatial position in the output domain that is the same as a spatial position of the at least one Intra coded segment T3.

The processing circuitry is further configured to construct a decodable second picture and to decode the decodable second picture. In such embodiments, each of the at least one segments T1 are placed at the same spatial position in the compressed domain as that of a corresponding segment T2, and the at least one Intra coded segment T3 is placed at one of the spatial positions of the segments T1 in the compressed domain in which there are no segments T2.

In one embodiment, each segment T1 for which there is a corresponding segment T2 in the same spatial position in the output domain, is coded using temporal prediction.

In one embodiment, a number of segments T1 and T2 having the same spatial position in the output domain is equal to K, and all remaining segments (M-K) in the second picture are coded using Intra prediction.

In one embodiment, K is greater than 1.

In one embodiment, the number of segments in the compressed domain is fixed.

In one embodiment, the number of spatial locations configured to receive a segment in the compressed domain is fixed.

In one embodiment, the segments inserted into the compressed domain are inserted into the spatial position of a segment that was removed from the compressed domain.

In one embodiment, the processing circuitry is further configured to map the spatial locations in the output domain to a corresponding segment.

In one embodiment, to map the spatial locations in the output domain to a corresponding segment, the processing circuitry is configured to identify the corresponding segment in the compressed domain, identify the spatial position of the corresponding segment in the compressed domain, and identify transformation of samples from the compressed domain to the output domain.

In one embodiment, to identify the corresponding segment in the compressed domain, the processing circuitry is further configured to identify the corresponding segment using a segment ID.

In one embodiment, to identify the corresponding segment in the compressed domain, the processing circuitry is further configured to identify the corresponding segment according to an order of mapping data.

In one embodiment, the order of the mapping data comprises an order in which the segments are sent in the video bitstream.

In one embodiment, the mapping data is sent interleaved with compressed segment data.

In one embodiment, to identify the corresponding segment in the compressed domain, the processing circuitry is further configured to specify a location of a segment sample in the compressed domain.

In one embodiment, to specify a location of a segment sample in the compressed domain, the processing circuitry is further configured to specify the coordinates of a segment rectangle.

In one embodiment, the processing circuitry is further configured to identify a position of a segment in the output domain using coordinates of a rectangle in the output domain.

In one embodiment, the processing circuitry is further configured to map a segment in the compressed domain to a segment position in the output domain.

In one embodiment, to map the segment, the processing circuitry is further configured to index each segment position in the output domain, and assign an output index value to each segment in the compressed domain. In such embodiments, the output index value corresponds to an indexed segment position in the output domain.

In one embodiment, the processing circuitry is configured to perform the mapping after a picture has been decoded to output the picture in the output domain.

In one embodiment, the processing circuitry is configured to perform the mapping before a picture has been decoded to arrange the segments in a bitstream, and after decoding to output the picture to the output domain.

In one embodiment, the second decodable picture comprises a frame packing of segments and a projection of the entire sphere.

In one embodiment, the decoder device is a server.

Embodiments of the present disclosure also provide a decoder circuit configured to receive a set of N compressed segments of a first picture, construct a decodable picture for the first picture, wherein the set of N compressed segments are placed in spatial positions in a compressed domain, and decode the decodable picture. The decoder circuit is also configured to receive a set of M compressed segments for a second picture that follows the first picture in a decoding order, in which:

M is equal to N;

the set of M compressed segments comprises one or more segments T1 and at least one Intra coded segment T3;

the set of N compressed segments comprises one or more segments T2;

the spatial positions of the one or more segments T1 in an output domain are the same as the spatial positions of the one or more segments T2 in the output domain, but the set of segments T2 does not comprise a segment having a spatial position in the output domain that is the same as a spatial position of the at least one Intra coded segment T3.

The decoder circuit is further configured to construct a decodable second picture and to decode the decodable second picture. In such embodiments, each of the at least one segments T1 are placed at the same spatial position in the compressed domain as that of a corresponding segment T2, and the at least one Intra coded segment T3 is placed at one of the spatial positions of the segments T1 in the compressed domain in which there are no segments T2.

In one embodiment, the decoder circuit is comprised in a server.

Embodiments of the present disclosure also provide a computer program comprising executable instructions that, when executed by a processing circuit in a decoder, causes the decoder to receive a set of N compressed segments of a first picture, construct a decodable picture for the first picture, wherein the set of N compressed segments are placed in spatial positions in a compressed domain, and decode the decodable picture. The executable instructions, when executed by the processing circuit, also cause the decoder to receive a set of M compressed segments for a second picture that follows the first picture in a decoding order, in which:

- M is equal to N;
- the set of M compressed segments comprises one or more segments T1 and at least one Intra coded segment T3;
- the set of N compressed segments comprises one or more segments T2;
- the spatial positions of the one or more segments T1 in an output domain are the same as the spatial positions of the one or more segments T2 in the output domain, but the set of segments T2 does not comprise a segment having a spatial position in the output domain that is the same as a spatial position of the at least one Intra coded segment T3.

The executable instructions, when executed by the processing circuit, also cause the decoder to construct a decodable second picture and to decode the decodable second picture. In such embodiments, each of the at least one segments T1 are placed at the same spatial position in the compressed domain as that of a corresponding segment T2, and the at least one Intra coded segment T3 is placed at one of the spatial positions of the segments T1 in the compressed domain in which there are no segments T2.

Embodiments of the present disclosure further provide a non-transitory computer-readable storage medium comprising a computer program stored thereon. The computer program comprises executable instructions that, when executed by a processing circuit in a decoder, causes the decoder to receive a set of N compressed segments of a first picture, construct a decodable picture for the first picture, wherein the set of N compressed segments are placed in spatial positions in a compressed domain, and decode the decodable picture. The executable instructions, when executed by the processing circuit, also cause the decoder to receive a set of M compressed segments for a second picture that follows the first picture in a decoding order, in which:

- M is equal to N;
- the set of M compressed segments comprises one or more segments T1 and at least one Intra coded segment T3;
- the set of N compressed segments comprises one or more segments T2;
- the spatial positions of the one or more segments T1 in an output domain are the same as the spatial positions of the one or more segments T2 in the output domain, but the set of segments T2 does not comprise a segment having a spatial position in the output domain that is the same as a spatial position of the at least one Intra coded segment T3.

The executable instructions, when executed by the processing circuit, also cause the decoder to construct a decodable second picture and to decode the decodable second picture. In such embodiments, each of the at least one segments T1 are placed at the same spatial position in the compressed domain as that of a corresponding segment T2, and the at least one Intra coded segment T3 is placed at one of the spatial positions of the segments T1 in the compressed domain in which there are no segments T2.

In one embodiment, the non-transitory computer-readable storage medium is comprised in a server device.

DETAILED DESCRIPTION

The "360-degree video" format is currently being used to convey and display virtual reality (VR) content to users. 360-degree video is typically represented using projection formats. The HMD rendering can be seen as placing the user inside a sphere, but due to data processing reasons and the fact that existing video frameworks (including the video codecs) operate on two-dimensional arrays, the spherical images are converted to rectangular two-dimensional arrays. There are many projection formats. Currently, two of the most popular projection formats are the equirectangular projection (ERP) format and the cube map projection (CMP) format.

The field-of-view when using today's HMD devices is limited to around 20% of the full sphere. This means that only 20% of the full 360-degree video is "consumed" (i.e., seen or viewed) by the user. Generally, the entire 360-degree video sphere is made available to the HMD device, which then crops out the part that is rendered for the user. That part, i.e.—the part of the sphere the user sees, is referred to herein as the "viewport."

Typically, video systems are configured to detect and track both the user's head movements and the direction the user is looking to allow for the optimization of resources. This permits the system to spend fewer resources on processing video samples that are not rendered to the user. For example, the HMD may be configured to measure the direction the HMD is facing to determine the "direction" in which the user is looking. Additionally, the interior of the HMD may have eye-tracker devices capable of tracking where the user is looking. So determined, the system can utilize both the "direction" in which the HMD is facing, as well as where the user's eyes are focused, to optimize the resources.

Without eye-tracker capabilities, the viewport or center of the viewport is used as a region-of-interest (ROI). With eye-tracker capabilities, however, the area around where the user's eyes are currently focused (i.e., where the user is currently looking) is considered to be the ROI. Additionally, with eye-tracker capabilities, the ROI may be smaller. Higher quality video is sent for rendering in the ROI as compared to other areas outside the ROI. The resources here can be bandwidth from a server to a client or the decoding capability of the device.

Figure 1:
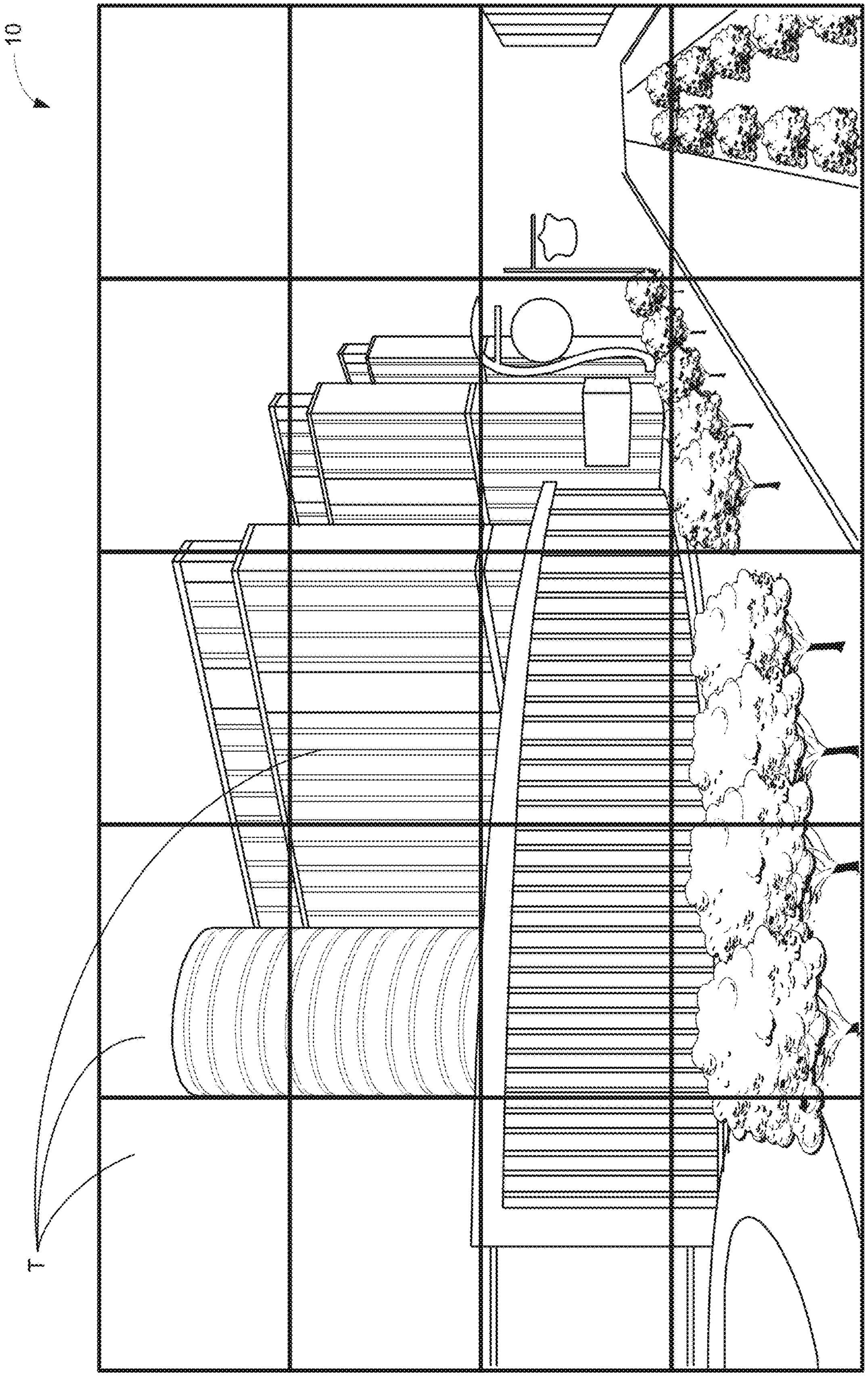
FIG. 1 illustrates an example partitioning of a picture into segments or tiles.

One way of using detected head movements to reduce the amount of required resources is to use the tiles feature of the High Efficiency Video Coding (HEVC) video coding format. With this feature, it is possible to use high-quality tiles for areas where the user is currently looking (e.g., within the viewport), and low-quality tiles for areas where the user is not looking (e.g. outside the viewport). Using tiles, a picture in HEVC can be partitioned into rows and columns of samples, where a "tile" or "segment" is the intersection of a row and a column. For example, FIG. 1 illustrates an example of a picture 10 partitioned into "tiles" or "segments" T using 4 rows of tiles or segments, and 5 columns of tiles or segments resulting in a total of 20 segments T.

HEVC tiles are spatially independently decodable since there are no decoding dependencies between tiles of the same picture. To make tile decoding temporally independent, however, the encoder operates according to some restrictions. As defined herein, "temporal independence" means that given a static tile partition structure over time, a specific tile position is not dependent on any tile in any other tile position. Temporal independent tiling splits a video into sub-videos, each sub-video being the size of the corresponding tile and independent of the contents of other sub-videos. If the data of such a sub-video is corrupted, no other sub-video is affected due to this independence. In this document, tiles, also referred to as "segments T," are assumed to be both spatially and temporally independent. However, a tile of a particular spatial position may be temporally dependent on spatially co-located tiles of previously coded pictures.

Another tool used to partition a picture is the use of "slices." Each picture is transmitted as a series of units, called macroblocks (MB) in H.264 and coding tree units (CTU) in HEVC. This series of units can be split into independent slices. Slices are similar to tiles in that both are independent. The main two differences between tiles and slices are:

1) how tiles and slices spatially split a picture; and
2) slices include a slice header comprising coding parameters for the slice.

In HEVC, each unit can be coded using intra prediction (also called I prediction), unidirectional inter prediction (also called P prediction) or bi-directional inter prediction (also called B prediction). One parameter in the HEVC slice header specifies the slice type. Slices that are "I slices" can only comprise intra predicted units. Slices that are "P slices" can only comprise intra or unidirectional inter units. Slices that are "B slices" can comprise all types of units. I, P, and B prediction are commonly utilized for pictures and tiles depending on the predictions that are used for the units in the picture or tile. For example, an Intra tile is a tile that contains only Intra predicted units.

The combination of tiles and slices is restricted in HEVC. Either all CTUs in a tile belong to the same slice or all CTUs belong to the same tile. It is common to use one slice per picture, regardless of whether the picture is or is not partitioned into multiple tiles.

In contrast to slices, tiles do not require as much header data. The header overhead per tile comprises the signalling of bit-stream offsets, which are present in the slice header. These bit-stream offsets indicate the starting point of all tiles in a picture. A decoder may decode the starting points in order to split the coded picture into coded tiles in order to distribute them for parallel decoding. In HEVC, the inclusion of bit-stream offsets in the slice header is mandatory when tiles are enabled.

One method of using tiles for 360-degree video streaming comprises first encoding a video sequence multiple times using tiles. The tile partitioning structure is the same in all encodings. The encodings are done at different video qualities, which results in at least one high-quality encoding and one low-quality encoding. This means that for each tile at a particular point in time, there is at least one high-quality tile representation and at least one low-quality tile representation. In general, the quality of the tiles (i.e., high-quality or low-quality) depends on a desired service quality. However, in one embodiment, the difference between a high-quality tile and a low-quality tile is the resolution of the tile.

For example, consider a system configured according to the present embodiments that uses a number of discrete different resolutions (e.g., two or three different resolutions). In systems that utilize two resolutions, with a first resolution being lower than a second resolution, tiles associated with the first (i.e., lower) resolution could be the low-quality tiles, and the tiles associated with the second (i.e., higher) resolution could be the high-quality tiles. In systems using three different resolutions (e.g., the first resolution being lower than both the second resolution and the third resolutions, and the second resolution being lower than the third resolution), tiles associated with the first resolution could be considered as being the low-quality tiles, while those associated with the second or third resolutions could be considered as being the high-quality tiles. Alternatively, only the tiles associated with the third resolution could be considered as being the high-quality tiles, while those associated with the first and second resolutions could be considered as the low-quality tiles.

In general, the quality of the tiles (i.e., high-quality or low-quality) depends on a desired service quality. However, in one embodiment, the high-quality tiles have twice the resolution of the low-quality tiles in each dimension. In another embodiment, the high-quality tiles have four times the resolution of the low-quality tiles in each dimension. Regardless, according to the present disclosure, the resolution of the high-quality tiles should satisfy the desired quality level for the part(s) of an image on which the user focuses. The resolution of the low-quality tiles, however, should correspond to the desired quality level for the part(s) of the image that are in the user's peripheral view. In many cases, the part(s) of the image in the user's peripheral view are significant lower resolution.

It should be noted, however, that the present embodiments do not link tile quality solely to image resolution. In other embodiments, for example, the high and low qualities of the tiles are related to bitrate. That is, in one embodiment, a high-quality tile is encoded at a higher bitrate than the low-quality tile. In such cases, there can, for example, be an arbitrary bitrate threshold value that separates the high-quality tiles from the low-quality tiles. Regardless, though, the high-quality tiles should satisfy the desired quality level for the part(s) of an image on which the user focuses, while the low-quality tiles should correspond to the desired quality level for the part(s) of the image that are in the user's peripheral view.

The following table provides some parameters for both high-quality (i.e., HQ) and low-quality (i.e., LQ) tiles.

| | | Example 1 |
|---|---|---|
| | Max luma samples for level 5.0 and 5.1 | 8912896 |
| HQ | Number of tiles per face (one dimension) | 4 |
| HQ | Number of tiles in viewport (one dimension) | 6 |
| HQ | Number of tiles in each face | 16 |
| HQ | Total number of tiles HQ | 96 |
| HQ | Face resolution (one dimension) | 1536 |
| HQ | Tile size in luma samples (one dimension) | 384 |
| HG | Tile size in CTUs (one dimension) | 6 |
| HQ | tile degree | 22.5 |
| HQ | Number of tiles in viewport | 36 |
| LQ | Number of tiles per face (one dimension) | 2 |
| LQ | Number of tiles in each face | 4 |
| LQ | Number of tiles in viewport (one dimension) | 3 |
| LQ | Total number of tiles LQ | 24 |
| LQ | Face resolution (one dimension) | 768 |
| LQ | Tile size in luma samples (one dimension) | 384 |
| LQ | Tile size in CTUs (one dimension) | 6 |
| LQ | tile degree | 45 |
| LQ | Number of tiles outside viewport | 15 |
| | viewport ratio in rendered domain | 0.375 |
| | viewport size in samples (one dimension) | 2304 |
| | left over square given level 5.0 and 5.1 | 1898.546813 |
| | viewport in coded domain | 0.666666667 |
| | Samples outside viewport | 2211840 |
| | Outside square | 1487.225605 |
| | Total number of tiles HQ plus LQ | 51 |
| | Coded sample rectangle width in tiles | 6 |
| | Coded sample rectangle height in tiles | 9 |
| | Total number of tiles in coded sample rectangle | 54 |
| | Number of dummy tiles | 3 |
| | Coded sample rectangle width in samples | 3456 |
| | Coded sample rectangle height in tiles | 2304 |
| | Samples total | 7962624 |
| | Will this fit in level 5.0 and 5.1? | TRUE |
| | Total tiles to stitch per picture | 54 |
| | Total tiles to stitch per second at 60 fps | 3240 |

Figure 2B:
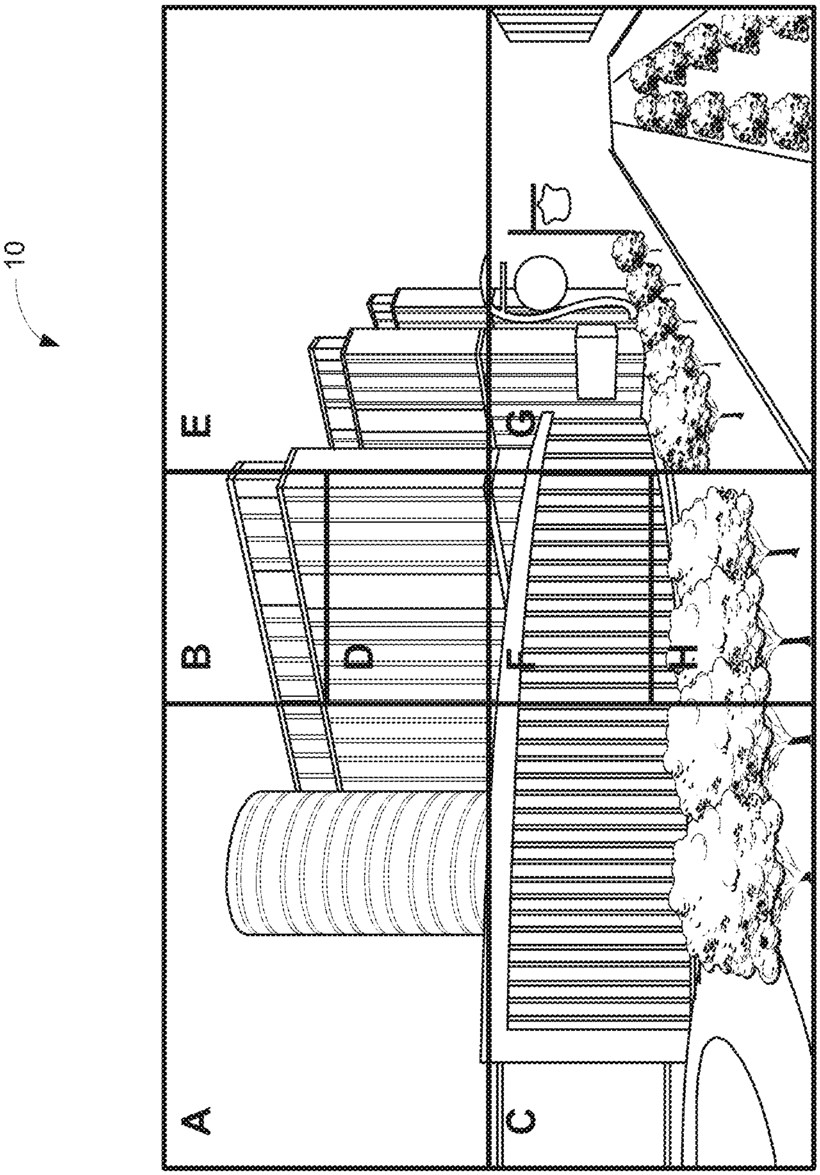
FIGS. 2A-2B illustrate a picture in a compressed domain and in an output domain, and that segments or tiles have a higher resolution that that of lower-quality segments or tiles.
Figure 2A:
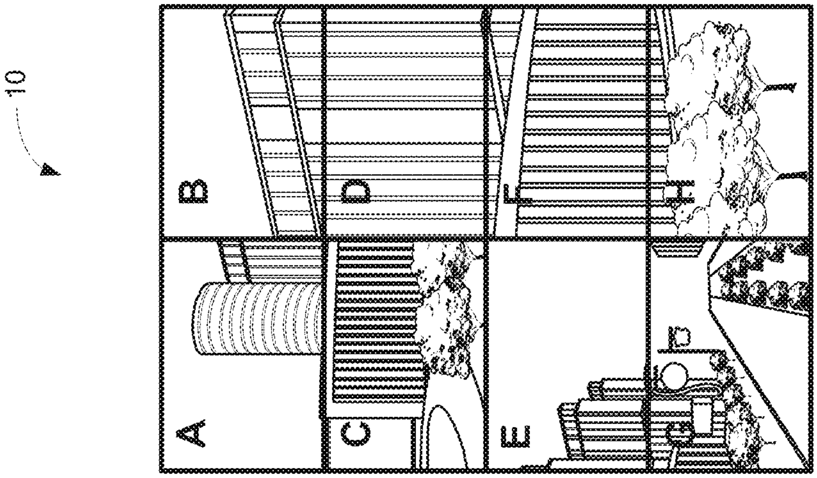

FIGS. 2A-2B illustrates an example of high-quality tiles having higher resolution than low-quality tiles. In particular, FIG. 2A (i.e., "Compressed Domain") shows a picture 10 that just has been decoded by a decoder. Pictures showing the output of the decoder (i.e., after decoding) are pictures shown in the compressed domain. In the example of FIG. 2A, all 8 tiles A-H in the compressed domain are of equal spatial size. Then, after decoding but before rendering, the tiles are scaled and arranged spatially. The outcome is shown in FIG. 2B (i.e., "Output Domain"). Pictures that have been prepared for rendering (i.e. after scaling and re-arrangement) are pictures shown in the output domain. The output domain in FIG. 2B illustrates picture 10 as it is presented or rendered to the user.

One way of thinking about the output domain is as the projection format. For example, a decoder may first be instructed to decode a bitstream, or part of the bitstream, to output picture 10 in FIG. 2A. Second, a mapping or conversion of the decoded output to the projection format is done, where the projection format can be the ERP format (i.e., illustrated in the Output Domain of FIG. 2B). Finally, the ERP picture is provided to the HMD renderer for rendering to the user. Then, in practice, the output domain is implementation-dependent and may differ between end-user devices. In most implementations, the renderer supports one or more picture formats and a conversion from the output of the decoder to one of the supported picture formats is performed. The output domain is the picture 10 in the supported format.

Another way of thinking about the output domain seen in the example of FIG. 2B is as a sphere representation. The output domain seen the FIG. 2B is then an illustration of picture 10 in the output (spherical) domain where samples on the sphere have been projected onto a 2D plane. One main aspect of the output domain is that the output domain illustrates the picture as it is presented to the user.

In FIGS. 2A-2B, tiles B, D, F, H are high-quality tiles since they have higher spatial fidelity in the output domain. Tiles A, C, E, G are low-fidelity tiles due to scaling.

Besides illustrating how tiles have different fidelities, FIGS. 2A-2B also illustrate that tiles in the compressed domain need not be ordered. Given that the tiles are both spatially and temporally independent, the spatial placement of tiles in the compressed domain is not vital.

The embodiments of the present disclosure assume that tiles of different qualities are stored on a server. Thus, there are multiple locations where the bitstream can be constructed. A first alternative constructs the bitstream on the server. In this case, information on what direction the user is looking is sent from the HMD device to the server. Upon receipt, the server assembles tiles of different qualities, constructs a decodable picture, and sends it to the device. A decodable picture is a picture in compressed format that is compliant to a specific video codec such as HEVC (i.e.—the picture can successfully be decoded by any standards-compliant HEVC decoder).

A second alternative is to configure the HMD device to request different tiles, or tile streams, from the server based on where the user is looking. As used herein, a "tile stream" is defined as a set of tiles, where the tiles in the set are consecutive tiles of one spatial position. The HMD device then constructs decodable pictures using the received tiles, feeds the decodable pictures to a standards-compliant decoder that decodes the pictures, coverts the output from the compressed domain to the output domain, and renders the picture for the user.

A decoder typically decodes multiple pictures. The order in which pictures are decoded is called the decoding order. This is also the order in which coded data is consumed by the decoder and typically the order in which data is transmitted. Some transport methods do support reordering such that data can be sent in another order. In these cases, however, there is a reordering method implemented in the receiver that reorders incoming data to an appropriate decoding order before providing the reordered data to the decoder.

Currently, a "layout" in the compressed domain is only changed at random access point (RAP) pictures, which are locations in the stream where the corresponding picture is Intra coded and random access can be made. As defined herein, a "layout" refers to the mapping of the tiles between the compressed domain and the output domain. Currently, responses to the changes detected in the user's viewpoint (e.g., those that are a result of when the user moves his/her head) cannot be done very quickly.

One common solution to achieve faster response to such "viewport changes" is to prepare at least three streams in advance, where each stream is tiled using the same tile structure. In particular:

A first stream (i.e., stream 1) comprises an all-Intra stream where all tiles are Intra coded at high-quality;

A second stream (i.e., stream 2) comprising a high bitrate, high-quality, regular stream coded using one reference picture; and A third stream (i.e., stream 3) comprising a low bitrate, low-quality, regular stream coded using one reference picture.

The stream to decode at the device is constructed by using the high-quality tiles from stream 2 to cover the current viewport, and to use the low-quality tiles from stream 3 for the other areas. When the viewport changes, there is a need to switch from stream 3 to stream 2 for the tiles in the viewport. This is done by inserting tiles from stream 1 as "switching tiles" to switch from low to high-quality.

The viewport changes also cause some tiles that the user could see to now not be seen by the user. For those tile positions, a corresponding switch from high-quality to low-quality is performed. However, tiles do not need to be switched. Rather, in these cases, the tiles can simply switch from being represented from stream 2 to stream 3.

Current methods for switching tiles from low to high-quality, and from high to low-quality, result in mismatch and a drift. The drift is not huge however, and it is expected that both stream 2 and 3 contains Intra coded tiles at regular intervals that corrects the drift.

Another concept in video coding and compression is known as "frame-packing." This technique stacks multiple frames together to form one single frame. Arranging two input frames into one by stacking them next to each other either horizontally (side-by-side) or vertically (top-bottom) is the most commonly used variants of frame-packing.

However, the approaches above are not without challenges. For example, head movements can trigger many Intra tiles to be sent in the bitstream. However, sending those Intra tiles cost a lot of bits. Another issue is that the user may move quickly. Such quick movements, however, result in low-quality tiles being rendered to the user. Although this effect may only last for a short time, the tile boundaries between low-quality tiles are likely to cause annoying tiling effects.

Another concern is tiling overhead. Each tile causes signaling overhead and imposes restrictions during encoding that decreases the compression efficiency. Another issue is that the number of tiles may be quite high, which complicates the process of constructing decodable pictures. This issue can be particularly concerning in cases where construction is performed by a server that serves multiple clients in parallel. Another issue is that current solutions do not support flexible ratios between the resolution of high resolution tiles and low resolution tiles. This is due to the nature of HEVC tiles.

Accordingly, embodiments of the present disclosure minimize the amount of Intra coded samples during streaming by only requiring Intra coding of the tiles when switching from low-quality tiles to high-quality tiles. In one embodiment, the present disclosure achieves this goal by maintaining the number of high-quality tiles in the compressed domain fixed, and replacing tiles in the compressed domain that fall out of the viewport with high-quality tiles that enter the viewport. The first such high-quality tiles are Intra coded. Additionally, embodiments of the disclosure need not utilize any real low-quality tiles. Instead, a frame-packing approach can be employed where a low-resolution version of the entire sphere is frame-packed together with the high-quality tiles.

Minimizing the amount of Intra coded samples that need to be sent in response to head movements, as is done in the present embodiments, is beneficial. Particularly, there is no need to send Intra code samples for a tile position that switches from high-quality to low-quality. Further, by utilizing a frame-packed background area, embodiments of the present disclosure minimize the number of tiles and tile boundaries.

System Description

The system uses video in a projection format. One preferred projection format is the packed cube map format, but the system may also be used with other projection formats such as the ERP format. The reason why the cube map format is preferred is that it is a format in which the area on the sphere that is covered by differently located single samples in the projection format varies less in area compared to some other formats such as ERP. Using ERP, an area near one of the poles of the sphere corresponds to many more samples in the ERP projection format than an area of the same area near the equator.

First, the number of tiles or "segments" T to use needs to be decided. If a cube map projection format is used, it is preferred that each face of the cube map is partitioned into tiles in a similar manner. It is also preferred that tiles have equal size and each tile only covers samples of one cube map face since alignment of face boundaries and tile boundaries reduces the total number of boundaries. On example is to partition each face into 5×5 tiles having equal size.

Secondly, the number of tiles to always send in high-quality is selected. It can be noted that today's HMDs are blurry in their peripheral areas so it may not be necessary to cover the full viewport at high-quality at all times. It can here be beneficial to select the number of tiles to always send in high-quality depending on the type of HMD device. When streaming to an HMD device with larger field-of-view, a higher number of high-quality tiles are selected since a higher number is needed to cover the larger field of view. For an HMD device with a more limited field-of-view, a smaller number may be selected. For an HMD using eye-tracking, an even smaller number may be selected. The selection of the number of high-quality tiles to use does not necessarily affect the preparation, including the encoding, of the content and can be done when a streaming session is being set-up. During a video session, the system tracks where the viewer is looking and decides which tile positions to select in high-quality.

The content is then encoded into tiles of high-quality. This is done by encoding the content in the selected projection format (e.g. cube map) using the selected tile partitioning structure (e.g. 5×5 tiles per cube map face). It is preferable to encode the content several times at different qualities/bitrates. Two options on how to encode the content are:

Option 1: For each quality/bitrate, the video is encoded as an IPPP stream using a fixed Intra interval of e.g. 1 second where the P pictures only predict from the previous picture. In addition, the video is encoded into at least one all-Intra stream.

Option 2: Select a GOP length n and for each quality/bitrate encode each tile in n offsets so that streams with I picture starting at any picture position are made available. The non-I pictures are here P or B pictures predicting backwards, and they can use multiple reference pictures. Low delay coding is used and there is no picture reordering. As an option, only a subset of all starting positions is provided, such as e.g. every second or every third picture. This would decrease the amount of required storage but the reduced granularity of tune-in points can cause a delay increase.

After the video encoding is complete, tile streams of different qualities can be formed. As defined herein a tile stream is a stream of a specific tile position in decoding order. For example, one tile stream is the stream of the tiles in the most top-left tile position. Since the tiles are spatially and temporally independent, a tile stream can be seen as a stream of a sub-video or cropped video. However, the tile streams are not intended to be compliant bitstreams but instead intended to be elements that can be put together to form decodable pictures.

In addition to the encoding of the high-quality tiles, the entire 360-degree video is encoded at a selected resolution, orientation and bitrate. This encoding, the background picture, typically also needs to be done using a tile structure to enable frame-packing with the high-quality tiles.

Streaming is then done by always sending the background and in parallel tiles from the tile streams that best cover the current viewport. For each Intra tile that is sent, the location of the tile in the output domain is signaled. When a viewport change is triggered, streaming of the tile streams that goes out of viewport focus immediately stops and streaming of the tile streams that comes into the viewport start such that the first tile in the new stream is a tile in which all units are Intra coded. Note that this first tile is preferably not encoded as data of an I-slice since it may well be the case that it is stitched together with tiles that are not Intra coded. The reason is that the decoding of a unit depends on the slice type. For instance, if the slice type is I, the decoder does not parse the skip_flag for any of the units in the slice but assumes that no unit is skipped. For the P and B slice types, the flag is parsed. This means that units coded using different slice types cannot be stitched together into one slice since some units contains the flag and some don't (unless a very complicated and computationally complex low-level re-writing of the bitstream is done).

For option 1, a viewport change triggers sending a high-quality tile stream that is not currently being sent. That is done by starting a new (logical) stream where the first tile is an Intra tile from the all-Intra stream followed by P tiles from the IPPPP stream for that tile position. This will cause some drift but that will be cleared up at the next Intra tile of the IPPPPP tile stream.

For option 2, a viewport change triggers a transmission of tiles from the tile stream for which the next tile is encoded using only Intra units. There is no drift when this option is used, but the storage requirement on the server is higher than for option 1 since more parallel streams are stored.

Bitrate control is done by carefully selecting what new tile streams to use given knowledge about the sizes of the currently streamed tile streams and the sizes of the options for the new tile streams. Note that selection is needed not only when viewport changes but whenever it is possible to make a stream selection (at every Intra tile; both Intra tiles triggered by viewport change and Intra tiles due to the use of periodic Intra tiles). This problem is ignored and not dealt with within this description.

The client receives the tile streams and forms decodable picture by stitching together received high-quality tiles and the background. The output from stitching is a decodable picture that is then decoded.

Conceptually, rendering is done by first scaling the background picture onto a high-resolution canvas in the projection format. Then the decoded high-quality tiles areas replace the corresponding area in the canvas. Finally, the canvas is given to the HMD renderer that displays the video to the user.

What have been described above is a system using frame-packing and a single decoder. There are two alternative options to this frame-packing system:

- Option A: The background is not frame-packed together with the high-quality tiles but decoded as a separate stream. This means that two decoders are needed, but one benefit is that the background does not have to be tiled at all. Another benefit is that the resolution of the background can be chosen freely since there is no constraint that the background needs to fit the frame-packed picture.
- Option B: Instead of using tiles, the tiles are separate decodable bitstreams. This means that 1+M decoders are necessary since the background also here is sent in parallel. Two advantages of this option are that tile stitching is not needed and that encoding can be done without imposing any tile partition restrictions. A third advantage is that any video codec can be used since it is not required that tiles are supported. Two disadvantages are 1) that many decoder instances are required and 2) each bitstream will have its own header, such as slice headers, which cost bits.

Minimizing the Amount of Intra Coded Samples

Embodiments of the present disclosure comprise a key mechanism to minimize the amount of Intra coded samples during streaming. Because Intra coded samples do not use temporal prediction from previously coded pictures, using Intra coding is less compression efficient than Inter-coding, where temporal prediction can be used. For compression efficiency reasons, the present embodiments can utilize temporal prediction when possible, as well as when the pictures are temporally correlated.

Minimization of Intra coded samples according to the present embodiments is achieved by keeping the number of high-quality tiles in the compressed domain fixed, and replacing the tiles that fall out of the viewport with high-quality tiles that enter the viewport. The tiles entering the viewport are Intra coded in the first picture they appear in. This permits tracking the user's eyes and determining where the user is looking. This also allows for the tracking the position of the viewport in the sphere.

A certain number of tiles are represented in high-quality. Thus, in one embodiment, the high-quality tiles cover the viewport while the user is looking around. It is not vital to cover 100% of the viewport at all times. However, one embodiment of the present disclosure covers a center of the viewport with high-quality tiles at all times.

By using a fixed number of high-quality tiles, embodiments of the disclosure replace some high-quality tiles with low-quality tiles responsive to the user's detected head movement. In such embodiments, the tiles are replaced while still in the compressed domain such that the tiles kept in high-quality during movement of the user's head are spatially stationary in the compressed domain. Thus, tiles that are maintained can use temporal prediction during the movement, such as seen in FIG. 3.

Figure 3:
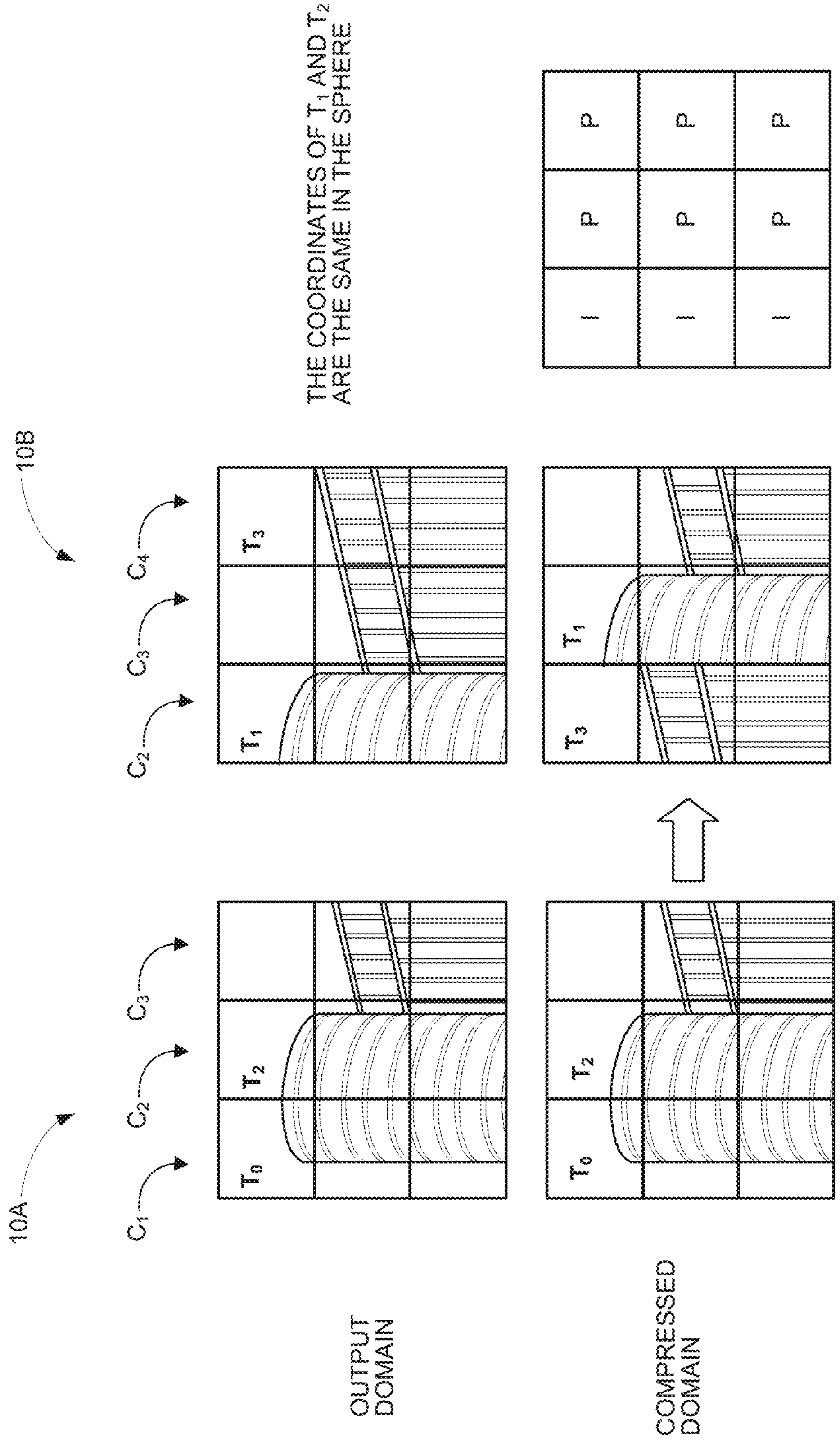
FIG. 3 illustrates an example arrangement for segments or tiles.

In more detail, FIG. 3 illustrates 9 high-quality tiles or segments T of a first picture 10A, and 9 high-quality tiles or segments T of a second picture 10B, where picture B follows picture A in decoding order. The compressed domain shows the tiles T as output from the decoder when the tiles T in the bitstream have been arranged according to the present disclosure. The spatial order of the tiles T shown in the compressed domain is identical to the spatial order as output from the decoder. The output domain shows the arrangement of the tiles T as they are presented to the user.

FIG. 3 also illustrates a result of a user turning his or her head to the right (e.g., a horizontal video pan to the right). As can be seen in the output domain of pictures 10A and 10B, the leftmost tile column $C_1$ is removed, the remaining two tile columns $C_2$ and $C_3$ are shifted left, and a new tile column $C_4$ is inserted on the right side. One observation that can be made upon inspection of FIG. 3 is that two of the columns in the output domain of picture 10A are also present in picture 10B. Therefore, to minimize the number of Intra coded samples, one could use Inter coding, and utilize temporal prediction for the samples of those two columns.

However, at the time the content is prepared, the encoder is not aware of when the user will turn his or her head. Thus, it is not possible for the encoder to know, a priori, when temporal prediction between tile positions will occur. As such, it may not be possible to encode the content as the tiles are arranged in the output domain and utilize temporal prediction.

However, according to embodiments of the present disclosure, it is possible to use temporal prediction in advance when encoding the content. To accomplish this function, embodiments of the present disclosure:

1) keep the number of high-quality tiles fixed;
2) use the spatial location (in the compressed domain) of the tiles that are removed for the tiles that are inserted;
3) maintain the spatial locations of the high-quality tiles that remain in the compressed domain; and
4) signal a mapping from the compressed domain to the output domain.

This is shown in the compressed domain where the positions of the tiles in the two rightmost columns are kept and the leftmost tile column is replaced by new content due to the movement. That new column is Intra coded while the other two columns are Inter coded. The bottom-right part of FIG. 3 shows which tiles are Intra (I) coded and which tiles are Inter (P) coded. This approach leads to a kind of scrambling of the tile positions in the compressed domain over time as the user looks around. However, scrambling does not affect the end result since the tiles are spatially and temporally independent. Further, the device keeps track of the scrambling and is able to map tiles from the compressed domain to the output domain.

In one embodiment, mapping from the compressed domain to the output domain ensures correct rendering. The mapping consists of specifying the spatial location in the output domain for each tile. There are two aspects of the mapping that are important in order for the mapping to be efficient in terms of bit cost or bandwidth cost. The first aspect is how often mapping information is sent. The second aspect relates to the particular form the mapping is sent.

Since the example of the proposed solution in FIG. 3 uses Intra coded tiles whenever the mapping for a specific tile changes, FIG. 3 only specifies the mapping for tiles that are Intra coded. Thus, for Intra tiles, there is information on the spatial location of that tile in the output domain. However, for non-Intra tiles, there is no such information. For the tiles with no information sent, the location mapping used for the previous tile in this position in the compressed domain is used also for the current tile in this position. Alternatively, in one embodiment, there is a flag sent for each tile that specifies whether there is mapping information present for the tile. In another embodiment, the presence of mapping information is conditioned on whether other data present in the bitstream.

In one embodiment, mapping all the tiles is conveyed with every picture. However, that can be expensive in terms of bit cost.

In one embodiment, mapping all the tiles is conveyed with every picture in which the tile arrangement is changed. For the other pictures, there is explicit or implicit information specifying that a previous mapping shall be used. One example is to keep using a current mapping until a different mapping is received. Alternatively, there is a range of pictures specified with each mapping that indicates what pictures each mapping applies to.

In one embodiment, the mapping data for a specific tile comprises the following parts:

Identification of the tile in the compressed domain;

Spatial position of the tile in the output domain; and

Any transformation of the samples from the compressed domain to the output domain. Two examples are spatial scaling and rotation.

Identification of the tile T in the compressed domain can be performed using a tileID, where the tileID is an integer n representing the number of a tile T in a sequence of tiles T from 0 . . . n−1, where n is the number of tiles T. In some embodiments, such as the embodiment illustrated in FIG. 3, n may be greater than 9. This is because FIG. 3 only shows the high-quality tiles T and not all the tiles T. As an example, an entire ERP picture may be partitioned into 14×8=112 tiles where 9 of the tiles T are selected as high-quality tiles. Alternatively, the identification of the tile in the compressed domain is done in order of the mapping data. In a first example, if mapping information is sent for all tiles T, the order of the mapping information can be set to the same order as the tiles T are sent in the video bitstream, or according to an ordering specified in a video codec specification.

Alternatively, the mapping information can be sent interleaved with the compressed tile data. For example, in one embodiment, mapping information can be sent as header data in a systems protocol. Identification of the tile in the compressed domain can alternatively be done by specifying the location of the tile samples in the compressed domain. In one embodiment, identifying a given tile T in the compressed domain comprises specifying the coordinates of the tile rectangle.

In one embodiment, the position of the tile T in the output domain is done by specifying the coordinates of a rectangle in the output domain. Some transformations of the samples can also be defined using destination coordinates. Alternatively, tile positions and areas in the output domain can be specified first and indexed. Mapping is then performed using the indices.

For example, consider an ERP picture 10 partitioned into 112 tiles T, in which the tile partitioning structure is kept constant. The tile sizes and locations in the compressed domain are specified in the video codec and conveyed in the video bitstream. Then, the tile partitioning structure in the output domain is specified where each tile T is given an output index between 0 and 111, for example. This structure is conveyed to the device and the mapping is performed by providing an output index value for each tile in the compressed domain.

In one embodiment, the mapping is applied after decoding of a picture to output a picture in the output domain. In another embodiment, the mapping is used both before decoding to arrange the tiles in a bitstream, as well as after decoding.

For example, in the context of FIG. 3, assume that a client device requests tiles T illustrated by picture 10A from a server. Then, responsive to detecting a head movement, the client device requests the tiles of picture 10 B from the server. Three of the tiles T are requested as Intra tiles, either as single tiles or as tiles streams that start with Intra tiles. The client device derives what tiles or tile streams to request based on previous information that it has received from the server. Such information identifies the tile partitioning used, the tiles that are available, the corresponding tile positions in the sphere, and the tiles that are Intra coded (or, in one embodiment, where the Intra tiles are located in the tile streams). The client device then receives the tiles of Picture B and merges (or stitches) the tiles together to form a decodable picture.

The tiles of picture 10B are arranged as shown for picture 10B in the compressed domain. In this embodiment, the client device uses the previous information to place the incoming compressed tiles in this arrangement in the bitstream to be decoded. The client device then decodes picture 10B and performs the conversion from the compressed domain to the output domain.

Figure 4A:
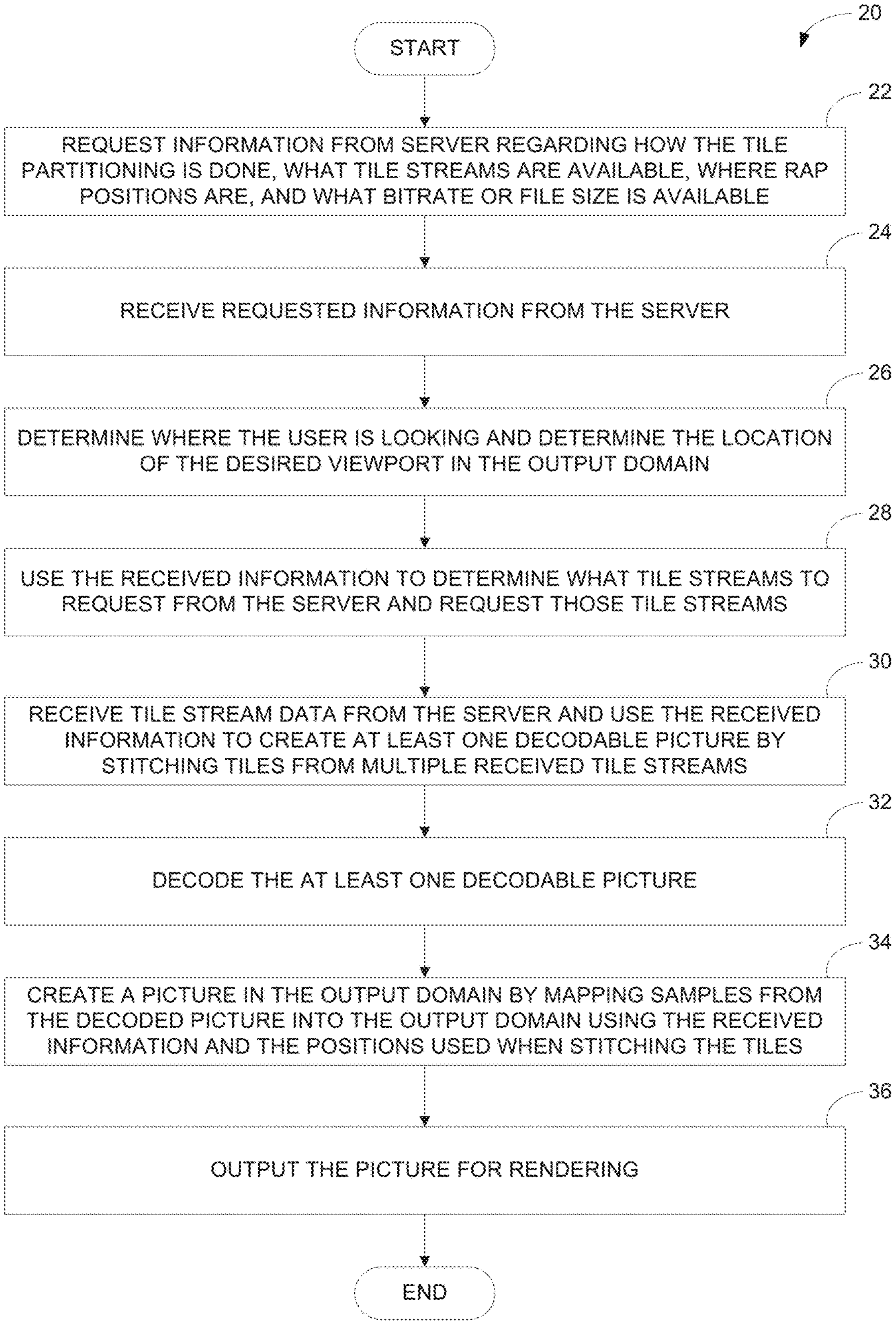
FIGS. 4A-4B are flow diagrams illustrating methods for decoding pictures according to one embodiment of the present disclosure.
Figure 4B:
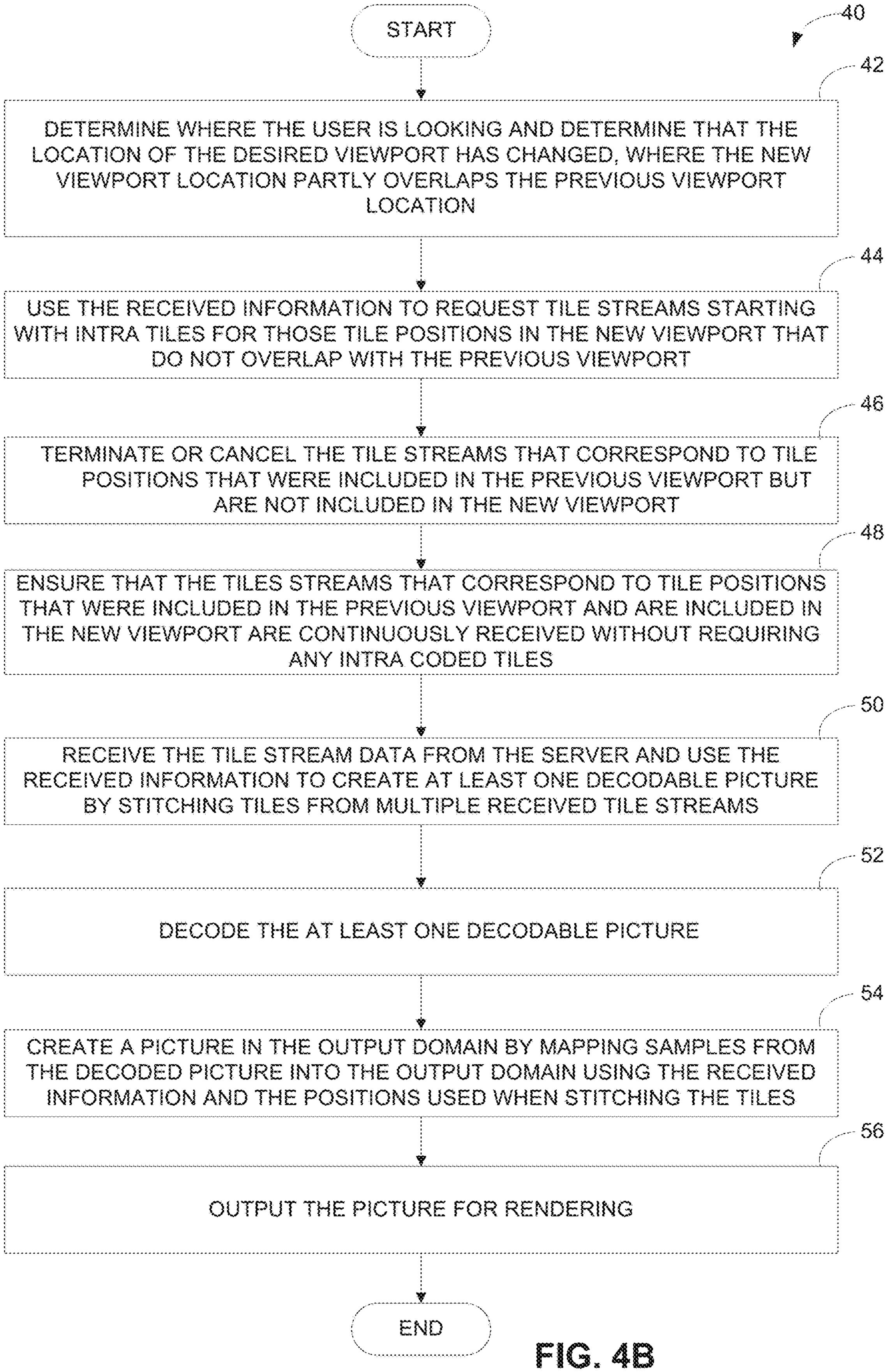

FIGS. 4A-4B illustrate a method 20, implemented at a decoder, for decoding and outputting pictures to a user wearing an HMD device according to one embodiment of the present disclosure.

As seen in FIG. 4A, method 20 begins with the decoder requesting information from a server (box 22). The information requested includes, but need not be limited to, information regarding how the tile partitioning is done, what tile streams are available, where the RAP positions are, and what bitrate or file size is available. Responsive to receiving the requested information from the server (box 24), the decoder determines (1) where the user is looking; and (2) the location of the desired viewport in the output domain (box 26). The decoder then uses the received information to determine what tile streams to request from the server, and request those tile streams (box 28). Upon receiving the tile stream data from the server, the decoder uses the received information to create at least one decodable picture by stitching tiles from multiple received tile streams (box 30). In one embodiment, the decoder stitches the tiles by arranging compressed tiles in a predetermined order and rewriting the headers. In one embodiment, the headers comprise picture headers, slice headers, or tile headers. The decoder then decodes the decodable picture (box 32), creates a picture in the output domain by mapping samples from the decoded picture into the output domain using the received information and the positions used when stitching the tiles (box 34), and outputs the picture for rendering to the user (box 36).

At some point, the user will move his or her head, creating the need to update the video rendered to the user. FIG. 4B illustrates a method 40 for performing this function according to one embodiment.

As seen in FIG. 4B, the decoder first determines (1) where the user is looking; and (2) that the location of the desired viewport has changed, where the new viewport location partly overlaps the previous viewport location (box 42). The decoder then uses the received information to request tile streams starting with Intra tiles for tile positions in the new viewport that do not overlap the previous viewport (box 44). The decoder then terminates or cancels the tile streams that correspond to tile positions that were included in the previous viewport, but are not included in the new viewport (box 46). The decoder then ensures that the tile streams that correspond to the tile positions included in both the previous viewport and the new viewport are continuously received without requiring any Intra coded tiles (box 48). To accomplish this function, one embodiment of the present disclosure configures the decoder to continue to request the corresponding tile streams. In another embodiment, the decoder is configured to simply allow those particular tile streams continue to stream.

Responsive to receiving the tile stream data from the server, the decoder uses the received information to create at least one decodable picture by stitching tiles from multiple received tile streams (box 50). In one embodiment, tile streams starting with Intra tiles that correspond to positions in the new viewport, and that do not overlap with the previous viewport, are placed in the compressed domain using positions that correspond to terminated or cancelled tile streams. The decoder then decodes the decodable picture (box 52) and creates a picture in the output domain by mapping samples from the decoded picture into the output domain using the received information and the positions used when stitching the tiles (box 54). The decoder then outputs the picture for rendering to the user (box 56)

Two Quality Layers and Frame-Packing

Besides conveying the high-quality tiles that (at least partly) cover the viewport, additional samples can be provided to the device. Currently, the entire picture is tiled, and tiles of a lower bitrate are used in combination with high-quality tiles. Thus, given, for example, a picture partitioned into 14×8=112 tiles T, 9 of which are of high-quality, there may be 103 low-quality tiles conveyed to the device in parallel. Those of ordinary skill in the art should appreciate that the specific identification of 9 high-quality tiles is illustrative only. In practice, the number of high-quality tiles may be much higher (e.g., 25 high-quality tiles).

As previously stated, there are some challenges associated with the conventional approach. Such challenges include, but are not limited to, head movements that trigger many Intra tiles to be sent in the bitstream, the tendency of the user to move quickly, leading to the rendering of low-quality tiles, tiling overhead, a complicated method for constructing decodable pictures, and a lack of support for flexible ratios between the resolution of high resolution tiles and low resolution tiles.

Figure 5:
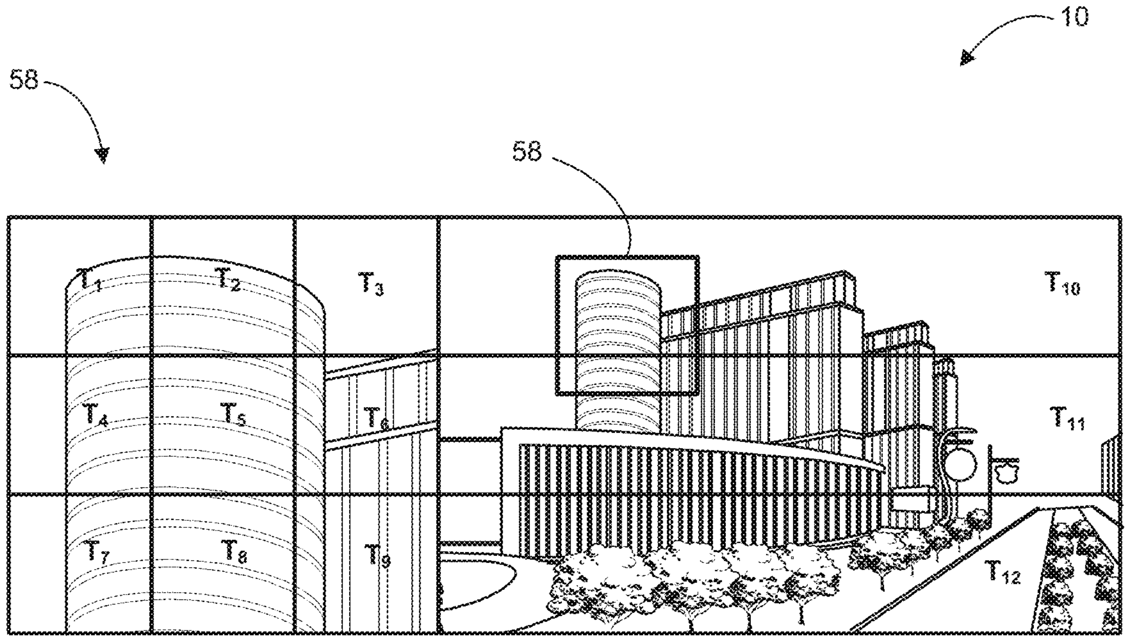
FIG. 5 illustrates an example arrangement for segments or tiles.

Embodiments of the present disclosure, however, use a frame-packing approach in which a low-resolution version of the entire sphere is frame-packed together with the high-quality tiles. FIG. 5 shows a decoded picture 10 according to one embodiment. In FIG. 5, there are 9 high-quality tiles $T_1$-$T_9$ on the left side of picture 10 that are frame-packed. A representation of the entire sphere is illustrated by the tiles $T_{10}$-$T_{12}$ on the right side of the picture 10. The representation of the entire sphere is referred to herein as the background. The white lines illustrate the tile partitioning and the black square 58 illustrates the area that is also represented by the high-quality tiles $T_1$-$T_9$ to the left.

As shown in FIG. 5, the background in the example is partitioned into three elongated rectangular tiles $T_{10}$-$T_{12}$. The partitioning of the background into tiles results from the need for conventional approaches, such as that provided by HEVC tiles, to partition the picture into rows and columns of samples spanning from left to right and top to bottom, respectively, across the entire picture. The number of tiles used in the background is kept to a minimum to maximize the compression efficiency and to avoid artifacts caused by tile boundaries as much as possible.

When compared to the example above (e.g., FIGS. 2A-2B), the use of 12 tiles total is minimal. Additionally, the area in the black square is small. Since 9 of the 112 tiles are in high-quality, only 8% of the background is duplicated. This percentage is even less when compared it to the entire frame-packed picture.

Figure 6:
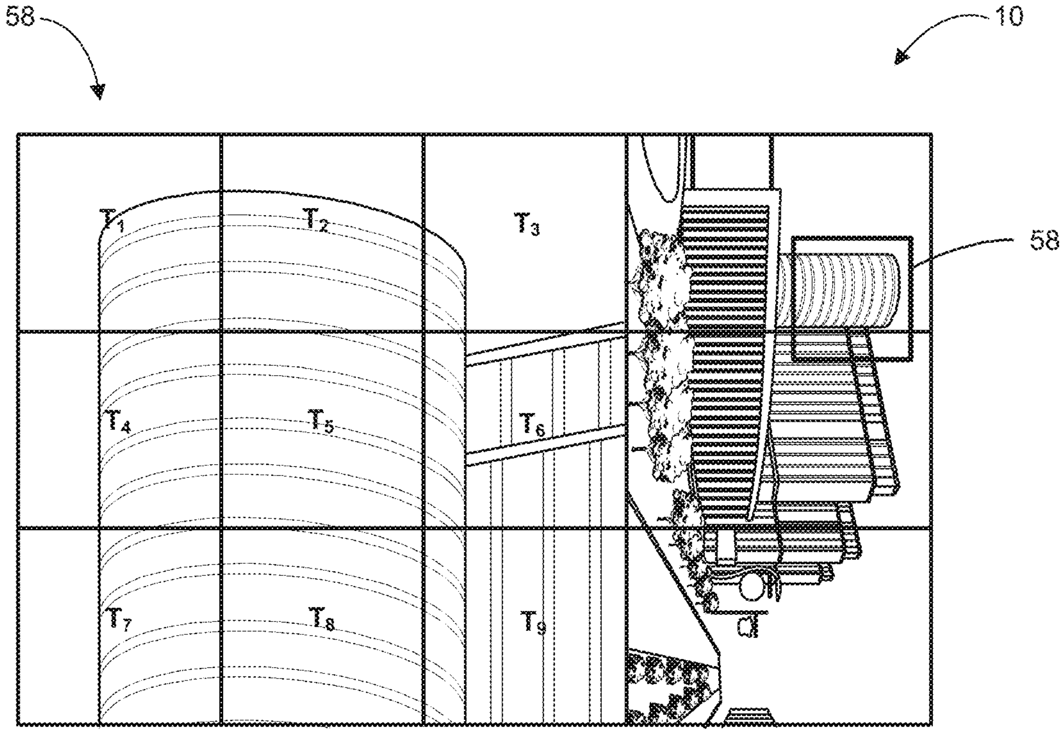
FIG. 6 illustrates an example arrangement for segments or tiles and a rotated background according to one embodiment of the present disclosure.

FIG. 6 shows an alternative packing layout according to another embodiment in which the background is smaller and is rotated to fit inside the picture. Note that other layout alternatives are possible according to the present embodiments, both for the high-quality tiles themselves and for how the frame-packing is designed. Thus, although FIGS. 5 and 6 illustrate specific examples of side-by-side frame packing, it is merely illustrative. It is possible to utilize other packing layouts, such as top-bottom, with the present embodiments.

When the picture 10 in FIG. 5 or 6 have been decoded, the decoded picture is converted or transformed from the compressed domain to the output domain using received mapping information. Except for the area that is covered by the high-quality tiles, which are converted using the mapping information, the background is scaled and optionally rotated to cover the entire sphere.

Figure 7:
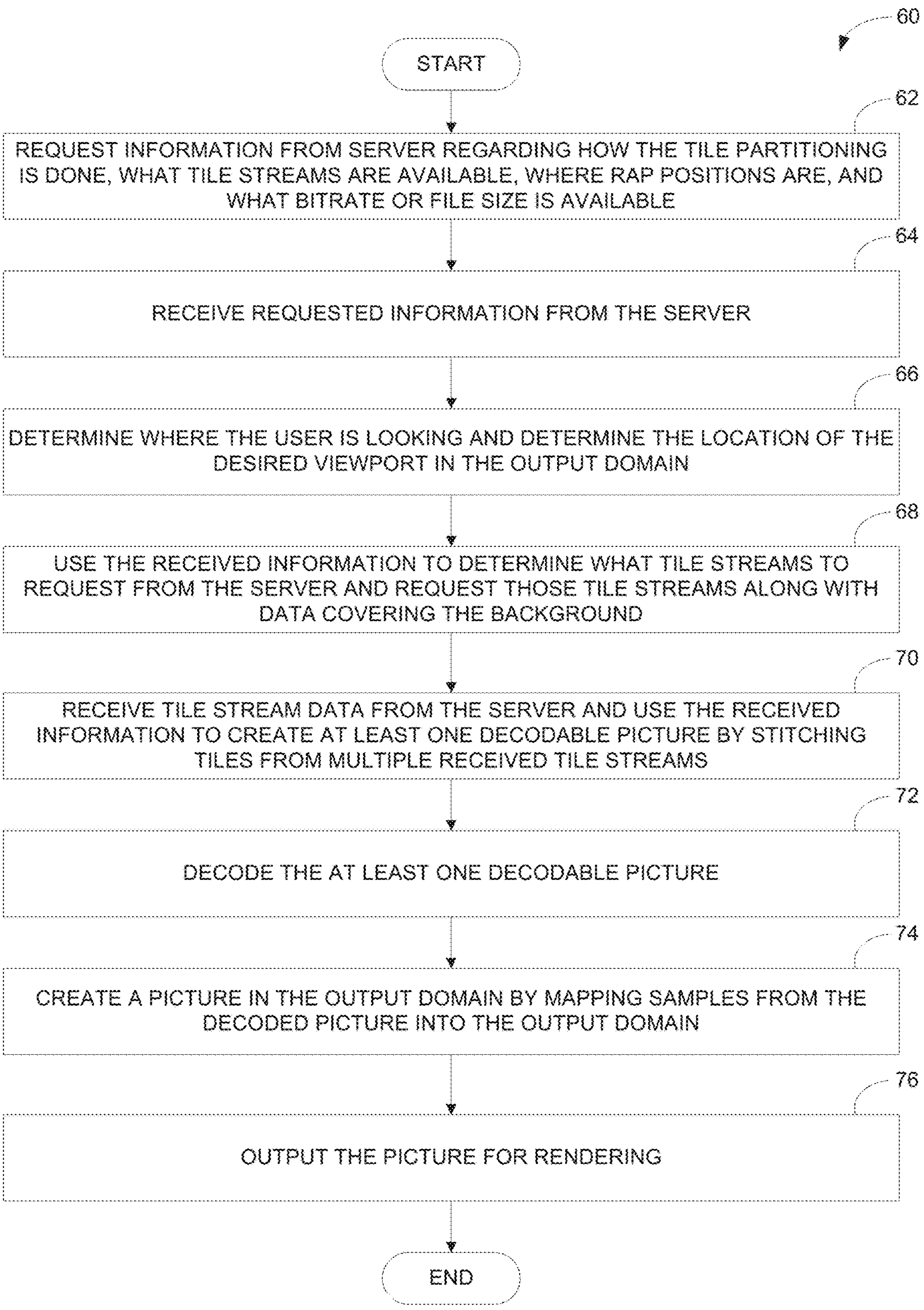
FIG. 7 is a flow diagram illustrating a method for decoding pictures according to one embodiment of the present disclosure.

FIG. 7 is a flow diagram illustrating a method 50, implemented at a decoder, for decoding and outputting pictures to a user wearing an HMD device according to one embodiment of the present disclosure.

As seen in FIG. 7, method 60 begins with the decoder requesting information from the server regarding how tile partitioning is done, what high-quality tile streams are available, where their RAP positions are, and what bitrate or file size is available (box 62). The decoder then receives that information from the server (box 64), and determines (1) where the user is looking; and (2) the location of the desired viewport in the output domain (box 66). The decoder then uses the received information to determine what high-quality tile streams to request from the server and requests those high-quality tile streams. Additionally, the decoder uses the received information to request data referred to herein as "background tiles" (box 68). In the context of the present disclosure, background tiles are those covering the background that is using tiles in such a way that it is possible to construct a decodable frame-packed picture in the compressed domain.

Responsive to receiving the tile stream data from the server, the decoder uses the received information to create at least one decodable picture by stitching tiles from multiple received tile streams (box 70). In one embodiment, the decoder stitches tiles received from the server by arranging compressed tiles in a predefined order and rewrites their headers. In one embodiment, the headers comprise picture headers, slice headers, or tile headers, and the high-quality tiles are frame packed together with the background tiles. The decoder then decodes the at least one decodable picture (box 72), and creates a picture in the output domain (box 74).

For example, in one embodiment, the decoder maps samples from the decoded picture into the output domain. The output domain picture is substantially identical to a picture constructed by first scaling and (optionally) rotating the background tiles such that the background tiles cover the entire output domain picture, and then overwriting samples in the output domain picture with samples of the high-quality tiles, where the position of the high-quality tiles is determined by using the received information and/or the positions used when stitching the tiles. Alternatively, in another embodiment, the samples from the decoded picture are handed to the renderer in a two-step process, where one step comprises passing the sample data of the background tiles to the renderer in a lower resolution, and another step comprises passing the sample data of the high-quality tiles to the renderer in a higher resolution. The renderer then at least partly performs scaling, optional rotation, and replacement of background tile samples with high-quality tile samples. Regardless, the decoder then renders the picture (box 76).

The embodiments described herein provide a viewport-based approach in which high-quality tiles are used to cover the viewport of an HMD device. However, those of ordinary skill in the art will readily appreciate that other systems operating in a similar manner but using high-quality tiles to cover other areas are also possible according to the present disclosure. Two examples of such other areas are 1) a part of the viewport such as the center of the viewport, and 2) the area around where the eyes are focusing as measured by an eye-tracker.

Figure 8:
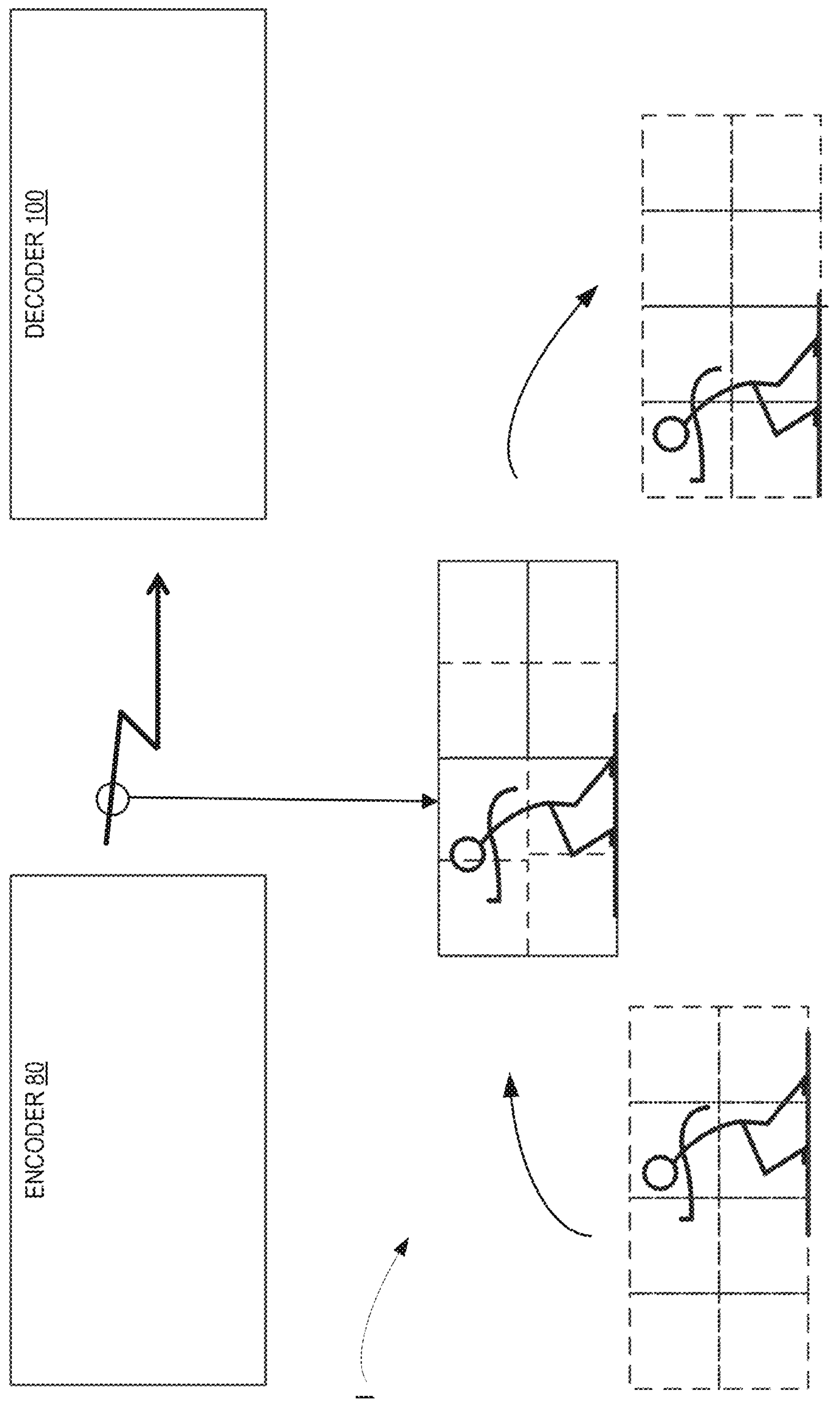
FIG. 8 illustrates a system configured to exchange a series of images that are encoded and decoded according to one embodiment of the present disclosure.

Embodiments herein are described with reference to a single partition structure defined by an encoder 80 or derived by a decoder 100, such as those illustrated in FIG. 8, for example, for a single image. Of course, one of ordinary skill in the art will appreciate that an encoder 80 and decoder 100 can be used separately or in conjunction to exchange (i.e., encode and decode, respectively) a series of images/as shown in FIG. 8.

Figure 9:
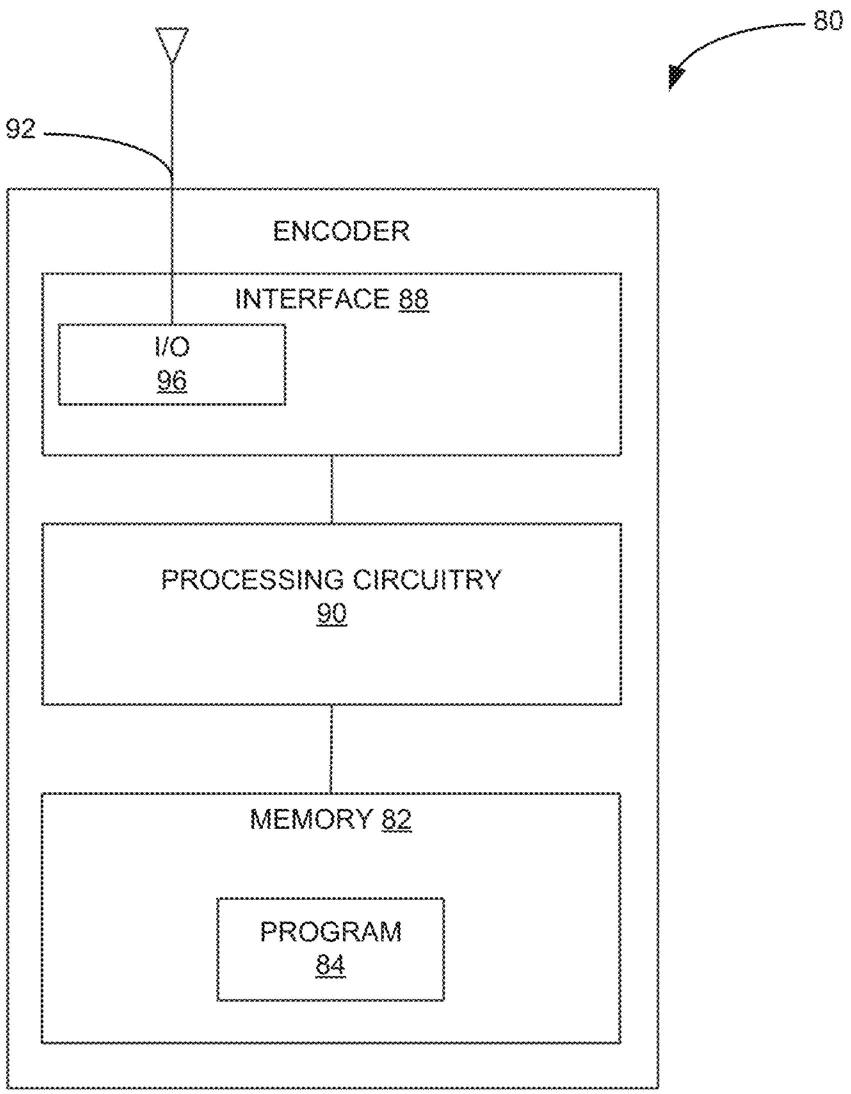
FIG. 9 is a schematic block diagram illustrating components of an encoder.

An encoder 80 and decoder 100 could be implemented using a suitable combination of hardware and/or software. Accordingly, an encoder comprising one or more processors and e.g. one or more memories is configured to carry out the methods according to the embodiments herein. FIG. 9 is a schematic diagram showing components of an encoder 80. The processor 90 could be any combination of one or more of a suitable central processing unit (CPU), multiprocessor, microcontroller, digital signal processor (DSP), application specific integrated circuit (ASIC) etc., capable of executing software instructions contained in a computer program 84 stored in one or more memories 82. The one or more memories 82 is for instance, a data buffer, Read-Write (RWM) Memory or Read-Only (ROM) memory. The encoder could comprise an interface 88 with an input and/or output circuit 86 configured to transmit a bit stream, e.g., via transmitter or transceiver 92.

Figure 11:
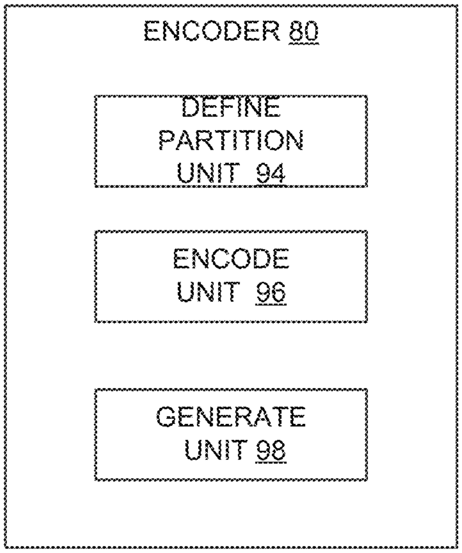
FIGS. 11-12 are schematic block diagrams illustrating some functional components of an encoder and a decoder, respectively.

As shown in FIG. 11 an encoder 80 could have units, modules, or circuits configured to carry out methods described herein. For instance, the encoder 80 of this embodiment comprises a define partition unit 94 that defines a partition structure that divides a picture into picture segments as described herein. The encoder 80 comprises an encode unit 96 that encodes picture segments in accordance with the partition structure to generate a plurality of coded picture segments. The encoder 80 comprises a generate unit 98 that generates a bit stream comprising the plurality of coded picture segments and information indicating the partition structure used to divide the picture into the plurality of picture segments.

Figure 10:
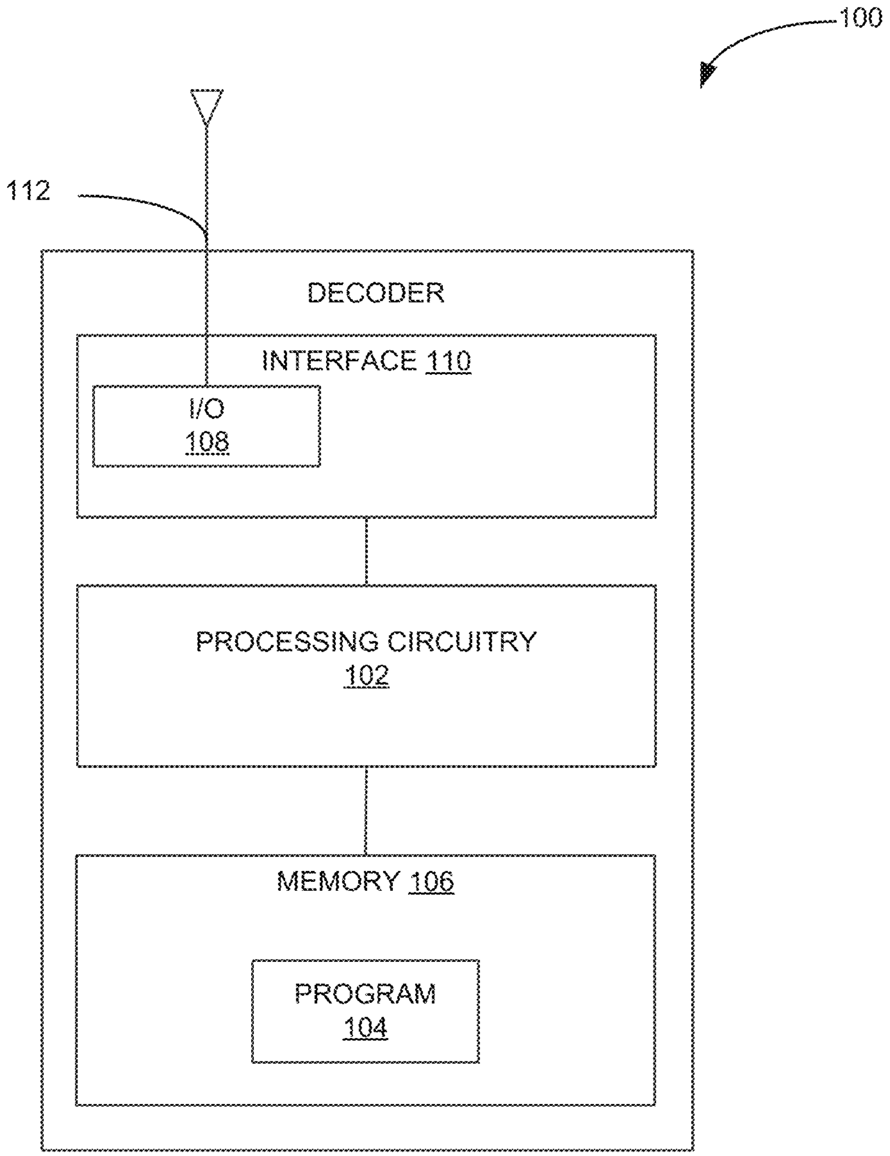
FIG. 10 is a schematic block diagram illustrating components of a decoder

Further, a decoder 100 comprising one or more processors and e.g. one or more memories is configured to carry out the methods according to the embodiments herein. FIG. 10 is a schematic diagram showing components of decoder 100. The processor 102 could be any combination of one or more of a suitable central processing unit (CPU), multiprocessor, microcontroller, digital signal processor (DSP), application specific integrated circuit (ASIC) etc., capable of executing software instructions contained in a computer program 104 stored in one or more memories 106. The one or more memories 106 is for instance, a data buffer, Read-Write (RWM) Memory or Read-Only (ROM) memory. The decoder 100 comprises an interface 110 with an input and/or output circuit 108 configured to receive a bit stream, e.g., via receiver or transceiver 112.

Figure 12:
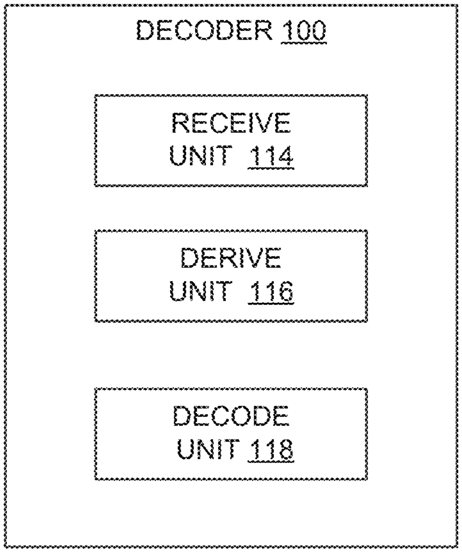

As shown in FIG. 12, a decoder 100 could have units, modules, or circuits configured to carry out methods described herein. For instance, the decoder 100 comprises a receive unit 114 configured to receive a bit stream. The decoder 100 comprises a derive unit 116 configured to derive, from the information in the bit stream, a partition structure. The decoder 100 comprises a decode unit 118 configured to decode a coded picture segment received in the bit stream in accordance with the partition structure.

Figure 13:
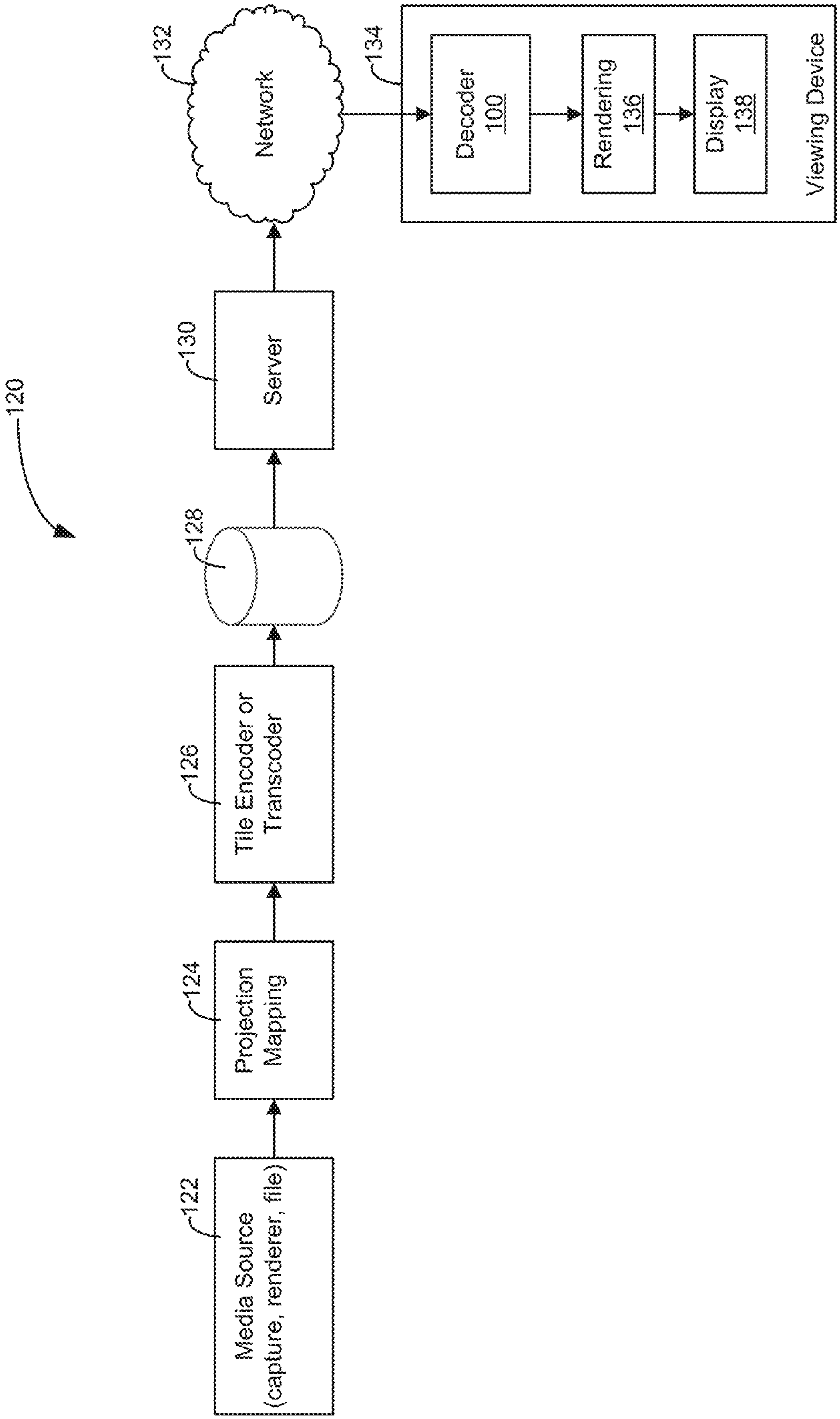
FIG. 13 is a system comprising a decoder and encoder according to one embodiment of the present disclosure.

FIG. 13 illustrates an example system or method 120 in which an encoder 80 and/or decoder 100 configured according to the present embodiments would be useful. The system comprises a media source 122 (e.g., a capture, renderer or file). The media source is fed to a projection mapping 124 and then to a tile encoder or transcoder 126, e.g. an encoder encoding as described herein. The encoded information can be stored in storage 128 and then fed to a server 130. It can be transmitted over a network 132 to a viewing device 134. For example, the image may comprise video, and the viewing device 134 has a decoder 100 as described herein for decoding the image, rendering 136 the image, and displaying the image on a display 138 to a user of the viewing device 134. Such a viewing device can be, for example, a Head Mounted Display (HMD) device or any display device.

One or more embodiments are applicable to applications in which a viewing device 134 receives one or more images in connection with a particular gaze direction of the device. In one embodiment, the device has received information from the server 130 explaining what tile streams are available and information about each tile stream such as spatial coverage and bitrate. The gaze direction of the viewing device is captured and the viewing device 134 requests a subset of tile streams from the server 128. The viewing device 134 receives tile streams and composes a single bitstream from the tiles streams and feeds the bitstream to the decoder for decoding 136. The viewing device 134 has the necessary information about the tile streams and knows how it composed the single bitstream. Therefore, the viewing device 134 is able to convert the decoded pictures into pictures that are suitable for rendering.

In another embodiment, the gaze direction of the viewing device 134 is captured and sent to the server 130. The server 130 composes a single bitstream from the stored tiles streams and sends the bitstream to the decoder 80. The necessary information how to convert the decoded pictures into pictures that are suitable for rendering is sent along with the bitstream. The viewing device 134 decodes the pictures (decoder 80), converts them and renders them (rendering 138) on a display 140. Optionally, the viewing device 134 or client continuously sends requests for what bitrate the stream should have.

It should be noted that the embodiments in this disclosure comprise segments or tiles having a rectangular shape, where each segment or tile has four sides. Additionally, each side borders either other segments or tiles or the picture boundary. That is, the picture can be extended to a size equal to an integer number of units.

In this disclosure, a “tile” is a type of segment, and the terms.

Some of the embodiments contemplated herein are described more fully with reference to the accompanying drawings. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art.

What is claimed is:

1. A method of decoding pictures from a bitstream of coded segments, each picture representing a view of a scene at a respective time, the view of the scene comprising a viewport representing a line of sight of a user to a respective region of the scene, wherein each coded segment represents a respective spatial region of the scene, the method comprising:

receiving the bitstream;

generating a first decodable picture by placing one or more coded segments from the bitstream, representing a region of the scene corresponding to a first viewport, in respective spatial positions in a decodable arrangement of coded segments for a first picture;

decoding the first decodable picture by decoding the decodable arrangement of coded segments for the first picture and placing the decoded segments for the first picture at respective spatial positions in an output arrangement of decoded segments for the first picture, according to a mapping of spatial positions in the decodable arrangement to spatial positions in the output arrangement, for use in rendering a respective view of the scene;

generating a second decodable picture by placing one or more coded segments from the bitstream, representing a region of the scene corresponding to a second viewport, at respective spatial positions in a decodable arrangement for a second picture, wherein:

a coded segment representing a region of the scene corresponding to the second viewport that is not represented in the first decodable picture is an intra-coded segment and is placed at a spatial position in the decodable arrangement for the second picture that corresponds to a spatial position in the decodable arrangement for the first picture used to represent a region of the scene that is not represented in the second decodable picture; and a coded segment representing a region of the scene corresponding to the second viewport that is included in the first viewport is a temporally-predicted segment and is placed at the same spatial position in the decodable arrangement for the second picture as for a coded segment in the decodable arrangement for the first picture representing the same region in the second viewport; and decoding the second decodable picture for output by decoding the decodable arrangement of coded segments for the second picture and placing the decoded segments for the second picture at respective spatial positions in an output arrangement of decoded segments for the second picture, according to the mapping, for use in rendering the respective view of the scene.

2. The method of claim 1, wherein:

the bitstream comprises coded segments representing regions of the scene other than those regions included in the first or second viewport;

generating the first decodable picture comprises selecting from the bitstream the one or more coded segments to represent the region of the scene corresponding to the first viewport, and placing the one or more coded segments selected from the bitstream for the first viewport at the respective spatial positions in the decodable arrangement of coded segments for the first picture; and generating the second decodable picture comprises selecting from the bitstream the one or more coded segments to represent the region of the scene corresponding to the second viewport and placing the one or more coded segments selected from the bitstream for the second viewport at the respective spatial positions in the decodable arrangement of coded segments for the second picture.

3. The method of claim 1, wherein the mapping further comprises an indication of a transformation to be applied to a respective decoded segment according to a predetermined rendering format.

4. The method of claim 3, wherein the transformation comprises one or more of:

a change to a height of a region represented by the decoded segment;

a change to a width of a region represented by the decoded segment; and a rotation of a region represented by the decoded segment.

5. The method of claim 1, wherein the decodable arrangement for the first picture comprises the same number of coded segments as the decodable arrangement for the second picture.

6. The method of claim 1, wherein the output arrangement for the first picture comprises the same number of decoded segments as the output arrangement for the second picture.

7. The method of claim 1, further comprising decoding from the bitstream mapping data providing an indication of the mapping.

8. The method of claim 7, wherein the mapping data comprise an output index value associated with each coded segment in the decodable arrangement, the output index value corresponding to an indexed segment position in the output arrangement.

9. The method of claim 1, wherein:

the view of the scene includes a view of a region of the scene outside of a respective one of said first and second viewport;

generating the first decodable picture further comprises placing one or more coded segments representing a region of the scene visible to the user outside of the first viewport at respective spatial positions in the decodable arrangement for the first picture; and generating the second decodable picture further comprises placing one or more coded segments representing a region of the scene visible to the user outside of the second viewport at respective spatial positions in the decodable arrangement for the second picture.

10. The method of claim 9, wherein the one or more coded segments representing the viewports comprise coded segments encoded at a first quality level and the one or more coded segments representing the regions of the scene visible to the user outside of the viewports comprise coded segments encoded at a second, lower quality level.

11. A decoding device, comprising a memory and a processor coupled to the memory, wherein the processor is configured to cause the decoding device to decode pictures from a bitstream of coded segments, each picture representing a view of a scene at a respective time, the view of the scene comprising a viewport representing a line of sight of a user to a respective region of the scene, wherein each coded segment represents a respective spatial region of the scene, the processor being configured to cause the decoding device to:

receive the bitstream;

generate a first decodable picture by placing one or more coded segments from the bitstream, representing a region of the scene corresponding to a first viewport, in respective spatial positions in a decodable arrangement of coded segments for a first picture;

decode the first decodable picture by decoding the decodable arrangement of coded segments for the first picture and placing the decoded segments for the first picture at respective spatial positions in an output arrangement of decoded segments for the first picture, according to a mapping of spatial positions in the decodable arrangement to spatial positions in the output arrangement, for use in rendering a respective view of the scene;

generate a second decodable picture by placing one or more coded segments from the bitstream, representing a region of the scene corresponding to a second viewport, at respective spatial positions in a decodable arrangement for a second picture, wherein:

a coded segment representing a region of the scene corresponding to the second viewport that is not represented in the first decodable picture is an intra-coded segment and is placed at a spatial position in the decodable arrangement for the second picture that corresponds to a spatial position in the decodable arrangement for the first picture used to represent a region of the scene that is not represented in the second decodable picture; and a coded segment representing a region of the scene corresponding to the second viewport that is included in the first viewport is a temporally-predicted segment and is placed at the same spatial position in the decodable arrangement for the second picture as for a coded segment in the decodable arrangement for the first picture representing the same region in the second viewport; and decode the second decodable picture for output by decoding the decodable arrangement of coded segments for the second picture and placing the decoded segments for the second picture at respective spatial positions in an output arrangement of decoded segments for the second picture, according to the mapping, for use in rendering the respective view of the scene.

12. The decoding device as in claim 11, wherein the bitstream comprises coded segments representing regions of the scene other than those regions included in the first or second viewport and the processor is further configured to cause the decoding device to:

generate the first decodable picture by selecting from the bitstream the one or more coded segments to represent the region of the scene corresponding to the first viewport, and placing the one or more coded segments selected from the bitstream for the first viewport at the respective spatial positions in the decodable arrangement of coded segments for the first picture; and generate the second decodable picture comprises selecting from the bitstream the one or more coded segments to represent the region of the scene corresponding to the second viewport and placing the one or more coded segments selected from the bitstream for the second viewport at the respective spatial positions in the decodable arrangement of coded segments for the second picture.

13. The decoding device of claim 11, wherein the mapping further comprises an indication of a transformation to be applied to a respective decoded segment according to a predetermined rendering format.

14. The decoding device of claim 13, wherein the transformation comprises one or more of:

a change to a height of a region represented by the decoded segment;

a change to a width of a region represented by the decoded segment; and a rotation of a region represented by the decoded segment.

15. The decoding device of claim 11, wherein the decodable arrangement for the first picture comprises the same number of coded segments as the decodable arrangement for the second picture.

16. The decoding device of claim 11, wherein the output arrangement for the first picture comprises the same number of decoded segments as the output arrangement for the second picture.

17. The decoding device of claim 11, wherein the processor is further configured to cause the decoding device to decode from the bitstream mapping data providing an indication of the mapping.

18. The decoding device of claim 17, wherein the mapping data comprise an output index value associated with each coded segment in the decodable arrangement, the output index value corresponding to an indexed segment position in the output arrangement.

19. The decoding device of claim 11, wherein the view of the scene includes a view of a region of the scene outside of a respective one of said first and second viewport and the processor is further configured to cause the decoding device to:

generate the first decodable picture by placing one or more coded segments representing a region of the scene visible to the user outside of the first viewport at respective spatial positions in the decodable arrangement for the first picture; and generate the second decodable picture by placing one or more coded segments representing a region of the scene visible to the user outside of the second viewport at respective spatial positions in the decodable arrangement for the second picture.

20. The decoding device of claim 19, wherein the one or more coded segments representing the viewports comprise coded segments encoded at a first quality level and the one or more coded segments representing the regions of the scene visible to the user outside of the viewports comprise coded segments encoded at a second, lower quality level.

* * * * *